(12) United States Patent
Uchida et al.

(10) Patent No.: US 6,249,541 B1
(45) Date of Patent: Jun. 19, 2001

(54) APPARATUS FOR REMOVING SHARED WAVES

(75) Inventors: Yoshinori Uchida; Shinji Matsumoto, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/029,724

(22) PCT Filed: Nov. 29, 1996

(86) PCT No.: PCT/JP96/03507

§ 371 Date: Feb. 13, 1998

§ 102(e) Date: Feb. 13, 1998

(87) PCT Pub. No.: WO98/24191

PCT Pub. Date: Jun. 4, 1998

(51) Int. Cl.[7] .................................. A61F 2/06; H04L 27/30
(52) U.S. Cl. ........................... 375/148; 375/144; 375/346
(58) Field of Search .................. 375/130, 136, 375/140, 141, 142, 144, 147, 148, 150, 254, 259, 285, 325, 343, 346, 347, 348, 349

(56) References Cited

U.S. PATENT DOCUMENTS

| | | |
|---|---|---|
| 4,470,138 | 9/1984 | Gutleber . |
| 4,817,151 | * 3/1989 | Bod et al. . |
| 5,150,383 | * 9/1992 | Misaizu et al. . |
| 5,363,403 | 11/1994 | Schilling et al. . |
| 5,467,368 | 11/1995 | Takeuchi et al. . |
| 5,469,465 | * 11/1995 | Birchler et al. ............... 375/346 |
| 5,694,437 | * 12/1997 | Yang et al. .................... 375/346 |
| 5,734,976 | * 3/1998 | Bartschi et al. .............. 455/333 |

FOREIGN PATENT DOCUMENTS

| | | |
|---|---|---|
| 5327658 | 12/1993 | (JP) . |
| 6268628 | 9/1994 | (JP) . |
| 9600470 | 1/1996 | (WO) . |

OTHER PUBLICATIONS

Matsuda et al., "Joint Detection and Rejection of Narrowband TDMA Signals Using Complex Multirate Filter Bank for DS–CDMA Signals", Technical Report of IECE, SST96–4 SAT96–18, RCS96–28 (1996–06), pp. 19–24.

Hara et al., "Co–existence Problem of TDMA and DS–CDMA Systems–Application of Complex Multirate Filter Bank", IEEE GLOBECOM 1996, Comm.: The Key to Global Prosperity. Conf. Record (Cat. No. 96CH35942), Proceedings of GLOBECOM '96. 1996 IEEE Global Tele. Conf., London, UK, Nov. 18–22, 1996, pp. 1281–1285, vol. 2, XP002096124.

* cited by examiner

*Primary Examiner*—Chi Pham
*Assistant Examiner*—Jean Buty Corrielus
(74) *Attorney, Agent, or Firm*—Rothwell, Figg, Ernst & Manbeck

(57) ABSTRACT

After amplification of a predetermined frequency component $f_0+nfd$ of an intermediate frequency signal extracted by a mixer (44), a shared wave signal thereof is demodulated and modulated, thereby reproducing TDMA serving as a shared wave signal. Further, a subtracter (51) subtracts the TDMA serving as the shared wave signal from the intermediate frequency signal to extract CDMA#1 signal serving as a desired wave signal.

16 Claims, 24 Drawing Sheets

FIG.8
(CONVENTIONAL ART)
(a) WAVEFORM WITH TRANSMISSION PATH DISTORTION
(b) WAVEFORM WITHOUT TRANSMISSION PATH DISTORTION
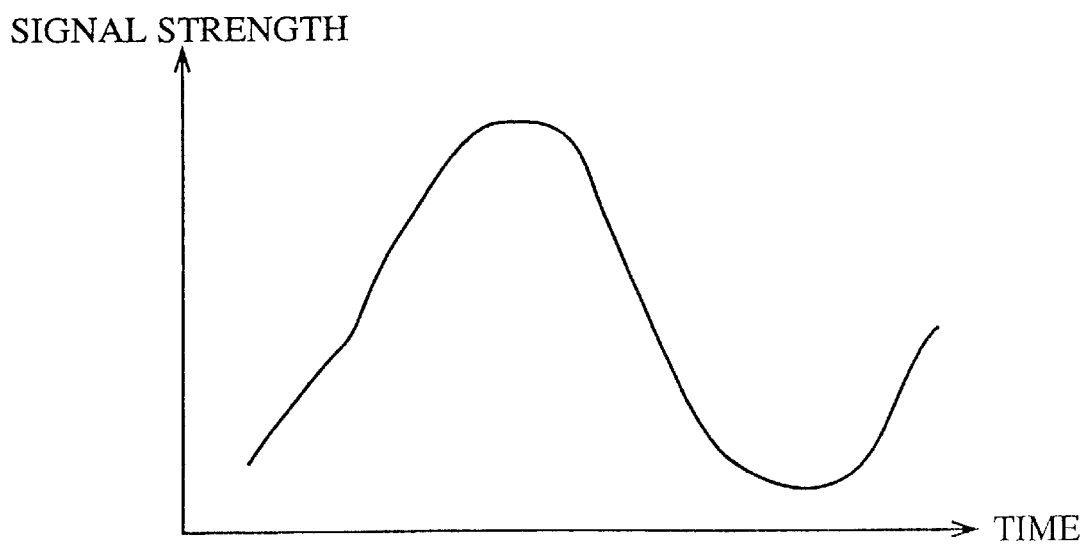

FIG.21
(a) WAVEFORM WITH TRANSMISSION PATH DISTORTION
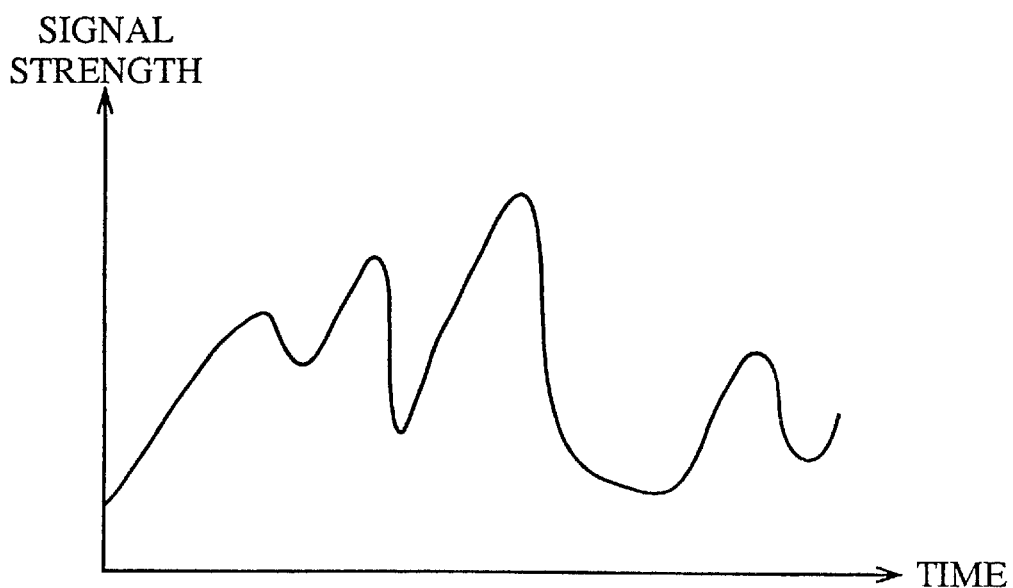
(b) WAVEFORM WITHOUT TRANSMISSION PATH DISTORTION
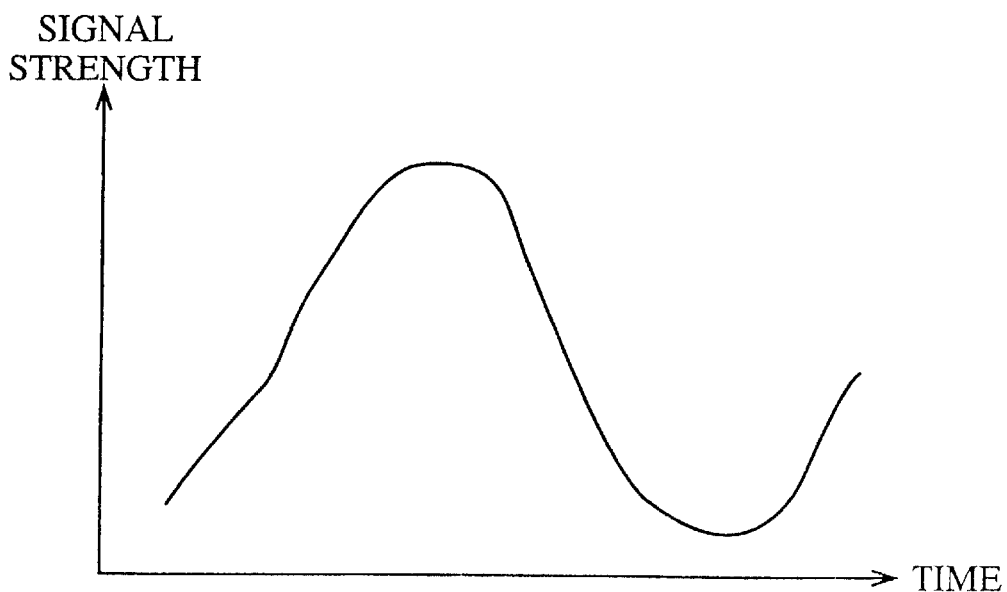

APPARATUS FOR REMOVING SHARED WAVES

RELATED APPLICATION

This is a 371 of PCT/JP96/03507, filed on Nov. 29, 1996.

TECHNICAL FIELD

The present invention relates to an apparatus for removing shared waves other than a desired wave signal contained in a radio frequency signal.

BACKGROUND ART

FIG. 1 is a block diagram showing a configuration of a conventional apparatus for removing shared waves. For example, U.S. Pat. No. 5,363,403 shows a related configuration. In the drawing, reference numeral 1 means an antenna to receive a radio frequency signal, 2 is an amplifier to amplify the radio frequency signal received by the antenna 1, 3 is a local oscillator to generate a local oscillation signal, and 4 is a mixer to mix the radio frequency signal amplified by the amplifier 2 with the local oscillation signal, thereby extracting an intermediate frequency signal.

Reference numeral 5 means a CDMA (Code Division Multiple Access) code generator to generate a shared wave identifying code for identifying a CDMA shared wave, 6 is a correlation detector to detect CDMA#2 signal serving as a shared wave signal through code correlation from the intermediate frequency signal depending upon the shared wave identifying code generated from the CDMA code generator 5, 7 is a demodulator to demodulate information of the CDMA#2 signal serving as the shared wave signal detected by the correlation detector 6, and 8 is a modulator to modulate the internal-oscillated intermediate frequency signal by the shared wave identifying code and the information of the CDMA#2 signal serving as the shared wave signal demodulated by the demodulator 7 depending upon the shared wave identifying code.

Further, reference numeral 9 means a delay circuit to delay the intermediate frequency signal transformed by the mixer 4 for a predetermined time period, 10 is a subtracter to subtract the CDMA#2 signal serving as the shared wave signal modulated by the modulator 8 from the intermediate frequency signal delayed by the delay circuit 9, 11 is a CDMA code generator to generate a desired wave identifying code for identifying a desired wave, 12 is a code correlator to detect CDMA#1 signal serving as a shared wave signal through code correlation from output of the subtracter 10 depending upon the desired wave identifying code generated from the CDMA code generator 11, and 13 is a demodulator to demodulate information of the CDMA#1 signal serving as the shared wave signal detected by the code correlator 12.

FIG. 2 is a block diagram showing a mobile communication system to which the conventional apparatus for removing shared waves is applied. In the drawing, reference numeral 21 means a mobile station equipped with the apparatus for removing shared waves, such as mobile vehicle communication apparatus, or mobile portable communication apparatus. Reference numeral 22 means a radio base station equipped with the apparatus for removing shared waves to communicate with the mobile station 21 through a radio channel 23. Reference numeral 24 means a satellite communication apparatus to communicate with the mobile station 21 through a radio channel 25, and 26 is a satellite communication ground base station equipped with the apparatus for removing shared waves to communicate with the satellite communication apparatus 24 through a satellite line 27.

Further, reference numeral 28 means a public switched telephone network (hereinafter referred to as PSTN), 29 is a wire telephone connected to the PSTN 28, 30 is a private system connected to the PSTN 28, 31 is an exchanger in the private system 30, 32 is a telephone apparatus connected to the exchanger 31, and 33, 34 and 35 are base stations in the private system 30, which are connected to the exchanger 31 and connected to the mobile station 21 through a radio channel 36, and are equipped with the apparatus for removing shared waves.

A description will now be given of the operation.

In radio communication between, for example, the mobile station 21 and the radio base station 22, or the mobile station 21 and the base station 33, that is, in each radio communication concurrently employing a frequency division multiple access method (hereinafter referred to as FDMA method), a multi-carrier time-division multiple access method (hereinafter referred to as TDMA method), a code division multiple access method (hereinafter referred to as CDMA method), and so forth, various types of radio waves are superimposed at the same frequency. Hence, the radio wave received by, for example, the mobile station 21 contains an unnecessary signal (hereinafter referred to as shared wave signal) in addition to a signal to be received (hereinafter referred to as desired wave signal). It is necessary to remove the shared wave signal from the received radio wave in order to extract the desired wave signal with less noise component due to the shared wave signal.

Thus, the apparatus for removing shared waves as shown in FIG. 1 is mounted on, for example, the mobile station 21 to extract the desired wave signal by removing the shared wave signal from the received radio wave.

A description will now be given of the operation of the apparatus for removing shared waves.

First, when the antenna 1 receives the radio frequency signal, the amplifier 2 amplifies the radio frequency signal.

After the amplifier 2 amplifies the radio frequency signal, the mixer 4 extracts the intermediate frequency signal by mixing the local oscillation signal generated from the local oscillator 3 with the radio frequency signal. In this illustration, for the sake of simplicity, it must be noted that the intermediate frequency signal contains CDMA#0 signal and the CDMA#2 signal serving as shared wave signals in addition to the CDMA#1 signal serving as the desired wave signal as shown in FIG. 3. In this connection, FIG. 9 shows a relationship between a frequency and a time slot in the mobile communication system shared between the TDMA method and a CDMA/TDMA method. For example, it is shown that the TDMA#3 and a partial frequency of the CDMA#3 share a time slot.

After the intermediate frequency signal is extracted by the mixer 4 in the above manner, the correlation detector 6 detects the CDMA#2 signal serving as a shared wave signal through code correlation from the intermediate frequency signal depending upon the shared wave identifying code generated from the CDMA code generator 5. That is, as shown in FIG. 4, the CDMA#2 signal serving as the shared wave signal is correlated by regarding the CDMA#0 signal and the CDMA#1 signal contained in the intermediate frequency signal as the noise components.

After the correlation detector 6 detects the CDMA#2 signal serving as the shared wave signal, the CDMA#0 signal and the CDMA#1 signal serving as the noise components are removed. Thus, the demodulator 7 and the modulator 8 demodulate and thereafter modulate the information of the CDMA#2 signal serving as the shared wave signal to output the information to the subtracter 10.

On the other hand, when the intermediate frequency signal is extracted by the mixer 4, the delay circuit 9 delays the intermediate frequency signal for the predetermined time period and thereafter outputs the signal to the subtracter 10 so as to overcome a difference in time between the intermediate frequency signal inputted into the subtracter 10 and the CDMA#2 signal serving as the reproduced shared wave signal.

The subtracter 10 can thereby subtract the CDMA#2 signal serving as the shared wave signal modulated by the modulator 8 from the intermediate frequency signal delayed by the delay circuit 9, thereby removing a shared wave signal component from the intermediate frequency signal (see FIG. 5).

After the subtracter 10 subtracts the CDMA#2 signal serving as the shared wave signal from the intermediate frequency signal, the code correlator 12 detects the CDMA#1 signal serving as the desired wave signal through code correlation from the intermediate frequency signal depending upon the desired wave identifying signal generated from the CDMA code generator 11. That is, as shown in FIG. 6, the CDMA#1 signal serving as the desired wave signal is extracted by regarding the CDMA#0 signal contained in the intermediate frequency signal as the noise component.

After the code correlator 12 detects the CDMA#1 signal serving as the desired wave signal, the demodulator 13 demodulates and outputs the information of the CDMA#1 signal serving as the desired wave signal, resulting in the completion of a series of processing.

The conventional apparatus for removing shared waves has the above structure. Therefore, it is possible to extract the CDMA#1 signal serving as the desired wave signal with relatively high accuracy even if the intermediate frequency signal contains the CDMA#0 signal and the CDMA#2 signal as the shared wave signals in addition to the CDMA#1 signal serving as the desired wave signal. However, as shown in FIG. 7, when the FDMA and the TDMA are contained as shared wave signals, the intermediate frequency signal still contains the FDMA and the TDMA having high signal power even after the subtracter 10 removes the CDMA#2 signal serving as the shared wave signal. Consequently, there is a problem in that, when the code correlator 12 detects the CDMA#1 signal serving as the desired wave signal through the code correlation, the CDMA#1 signal serving as the desired wave signal can not be extracted with high accuracy under the influence of the FDMA or the TDMA.

Further, in the conventional apparatus for removing shared waves, even when transmission path distortion is caused in the radio frequency signal with propagation through a plurality of paths (see FIG. 8), the demodulator 7 demodulates the information of the CDMA#2 signal serving as the shared wave signal without compensating for the transmission path distortion of the CDMA#2 signal serving as the shared wave signal. Hence, even when the modulator 8 modulates and reproduces the information of the CDMA#2 signal serving as the shared wave signal, the transmission path distortion can not accurately be reproduced (there is a difference in waveform between the shared wave signal contained in the intermediate frequency signal outputted from the delay circuit 9 and the shared wave signal outputted from the modulator 8). The subtracter 10 can not accurately remove the CDMA#2 signal serving as the shared wave signal from the intermediate frequency signal. As a result, there is another problem of a lower accuracy with which the CDMA#1 signal serving as the desired wave signal is extracted.

The present invention is made to overcome the above problems. It is an object of the present invention to provide an apparatus for removing shared waves in which a desired wave signal can be extracted with high accuracy even when an intermediate frequency signal contains FDMA or TDMA as a shared wave signal.

It is another object of the present invention to provide an apparatus for removing shared waves in which a desired wave signal can be extracted with high accuracy even when transmission path distortion is caused in a radio frequency signal with propagation through a plurality of paths.

DISCLOSURE OF THE INVENTION

According to a first aspect of the invention, there is provided an apparatus for removing shared waves in which a shared wave signal is reproduced by amplifying a predetermined frequency component of an intermediate frequency signal extracted by means for extracting intermediate frequency, and demodulating and modulating the amplified predetermined frequency component.

This results in an effect in that a desired wave signal can be extracted with high accuracy even when the intermediate frequency signal contains the shared wave signal such as FDMA or TDMA.

According to a second aspect of the invention, there is provided an apparatus for removing shared waves in which compensation is made for transmission path distortion of a predetermined frequency component, while the transmission path distortion is provided for a reproduced shared wave signal.

It is thereby possible to remove the shared wave signal from an intermediate frequency signal with high accuracy even when the transmission path distortion is caused in a radio frequency signal with propagation through a plurality of paths. As a result, there is an effect in that a desired wave signal can be extracted with high accuracy.

According to a third aspect of the invention, there is provided an apparatus for removing shared waves in which a signal level of a shared wave signal contained in an intermediate frequency signal is detected to control a signal level of a reproduced shared wave signal depending upon the result of detection.

It is thereby possible to enhance an accuracy with which the shared wave signal contained in the intermediate frequency signal is removed, resulting in an effect in that a desired wave signal can be extracted with high accuracy.

According to a fourth aspect of the invention, there is provided an apparatus for removing shared waves in which a control is made to a phase of a reproduced shared wave signal depending upon the result of detection of phase difference detecting means.

It is thereby possible to enhance an accuracy with which the shared wave signal contained in the intermediate frequency signal is removed, resulting in an effect in that a desired wave signal can be extracted with high accuracy.

According to a fifth aspect of the invention, there is provided an apparatus for removing shared waves in which compensation is made for transmission path distortion of a desired wave signal.

This results in an effect in that the desired wave signal can be extracted with higher accuracy even when the transmission path distortion is caused in a radio frequency signal with propagation through a plurality of pats.

According to a sixth aspect of the invention, there is provided an apparatus for removing shared waves in which shared wave signals reproduced by a plurality of means for reproducing shared wave are respectively subtracted from an intermediate frequency signal extracted by means for extracting intermediate frequency.

This results in an effect in that the plurality of shared wave signals can concurrently be removed.

According to a seventh aspect of the invention, there is provided an apparatus for removing shared waves in which a shared wave signal is reproduced through code correlation from an intermediate frequency signal, compensation is made for transmission path distortion of the shared wave signal, while the shared wave signal compensated for the transmission path distortion is demodulated and modulated to provide the transmission path distortion for the demodulated and modulated shared wave signal.

It is thereby possible to remove the shared wave signal from the intermediate frequency signal with high accuracy even when the transmission path distortion is caused in a radio frequency signal with propagation through a plurality of paths. As a result, there is an effect in that a desired wave signal can be extracted with high accuracy.

According to an eight aspect of the invention, there is provided an apparatus for removing shared waves in which a signal level of a shared wave signal contained in an intermediate frequency signal is detected to control a signal level of a reproduced shared wave signal depending upon the result of detection.

It is thereby possible to enhance an accuracy with which the shared wave signal contained in the intermediate frequency signal is removed, resulting in an effect in that a desired wave signal can be extracted with high accuracy.

According to a ninth aspect of the invention, there is provided an apparatus for removing shared waves in which a control is made to a phase of a reproduced shared wave signal depending upon the result of detection of phase difference detecting means.

It is thereby possible to enhance an accuracy with which the shared wave signal contained in the intermediate frequency signal is removed, resulting in an effect in that a desired wave signal can be extracted with high accuracy.

According to a tenth aspect of the invention, there is provided an apparatus for removing shared waves in which compensation is made for transmission path distortion of a desired wave signal.

This results in an effect in that the desired wave signal can be extracted with higher accuracy even when the transmission path distortion is caused in a radio frequency signal with propagation through a plurality of paths.

According to an eleventh aspect of the invention, there is provided an apparatus for removing shared waves in which shared wave signals reproduced by a plurality of means for reproducing means are respectively subtracted from an intermediate frequency signal extracted by means for extracting intermediate frequency.

This results in an effect in that the plurality of shared wave signals can concurrently be removed.

According to a twelfth aspect of the invention, there is provided an apparatus for removing shared waves in which a shared wave signal is reproduced through code correlation from an intermediate frequency signal, compensated compensation is made for transmission path distortion of the shared wave signal, while the shared wave signal compensated for the transmission path distortion is demodulated and modulated to provide the transmission path distortion for the demodulated and modulated shared wave signal.

It is thereby possible to remove the shared wave signal from the intermediate frequency signal with high accuracy even when the transmission path distortion is caused in a radio frequency signal with propagation through a plurality of paths. As a result, there is an effect in that a desired wave signal can be extracted with high accuracy.

According to a thirteenth aspect of the invention, there is provided an apparatus for removing shared waves in which a signal level of a shared wave signal contained in an intermediate frequency signal is detected to control a signal level of a reproduced shared wave signal depending upon the result of detection.

It is thereby possible to enhance an accuracy with which the shared wave signal contained in the intermediate frequency signal is removed, resulting in an effect in that a desired wave signal can be extracted with high accuracy.

According to a fourteenth aspect of the invention, there is provided an apparatus for removing shared waves in which a control is made to a phase of a reproduced shared wave signal depending upon the result of detection of phase difference detecting means.

It is thereby possible to enhance an accuracy with which the shared wave signal contained in the intermediate frequency signal is removed, resulting in an effect in that a desired wave signal can be extracted with high accuracy.

According to a fifteenth aspect of the invention, there is provided an apparatus for removing shared waves in which compensation is made for transmission path distortion of a desired wave signal.

This results in an effect in that the desired wave signal can be extracted with higher accuracy even when the transmission path distortion is caused in a radio frequency signal with propagation through a plurality of paths.

According to a sixteenth aspect of the invention, there is provided an apparatus for removing shared waves in which shared wave signals reproduced by a plurality of means for reproducing are respectively subtracted from an intermediate frequency signal extracted by means for extracting intermediate frequency.

This results in an effect in that the plurality of shared wave signals can concurrently be removed.

BRIEF DESCRIPTION OF THE DRAWINGS

FIG. 8 is a waveform diagram illustrating transmission path distortion with propagation through a plurality of paths.

FIG. 21 is a waveform diagram illustrating transmission path distortion with propagation through a plurality of paths.

BEST MODE FOR EMBODYING THE INVENTION

For a more detailed description of the present invention, a description will now be given of the best mode for practicing the present invention with reference to the accompanying drawings.

Embodiment 1

Figure 1:
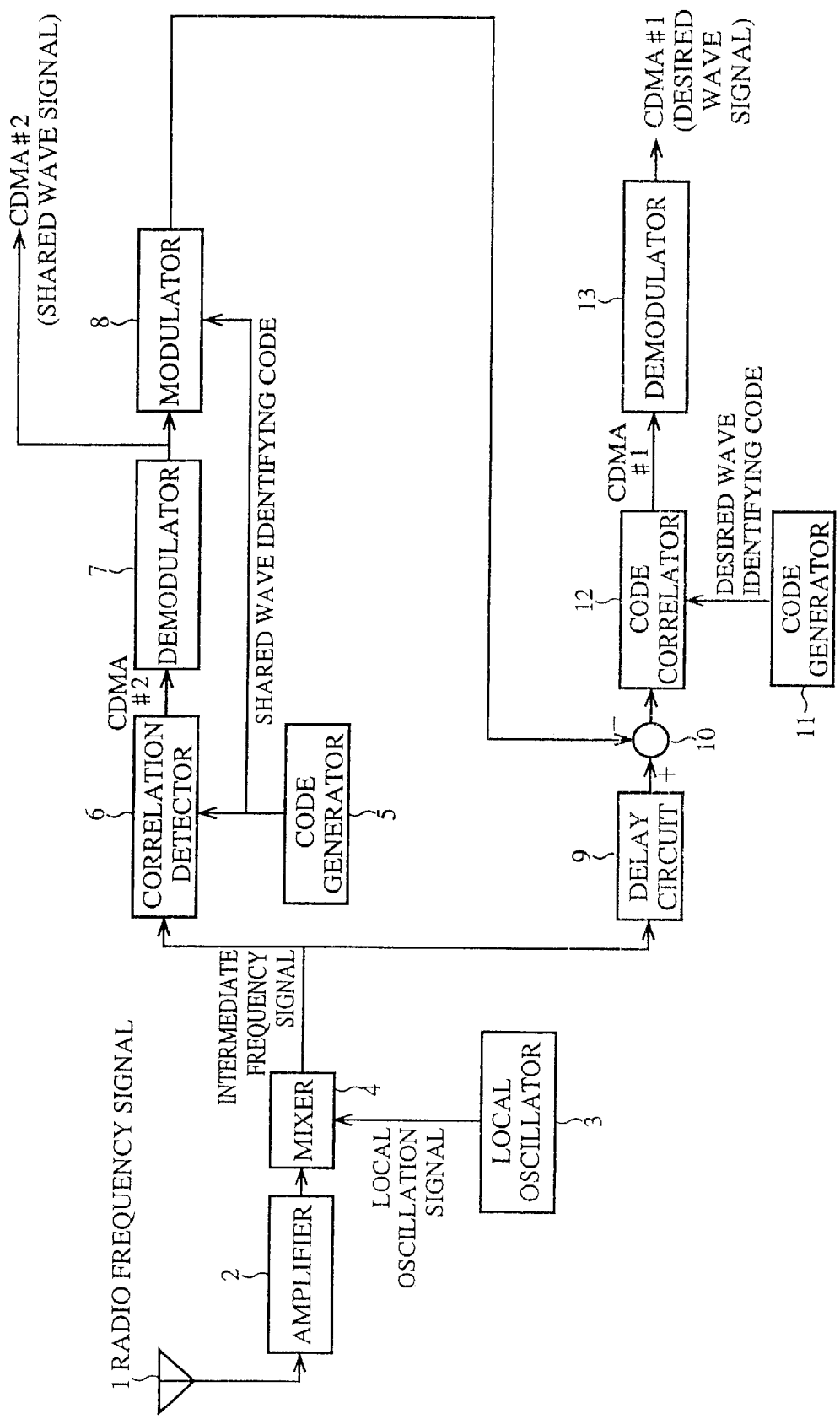
FIG. 1 is a block diagram showing a configuration of a conventional apparatus for removing shared waves.
Figure 2:
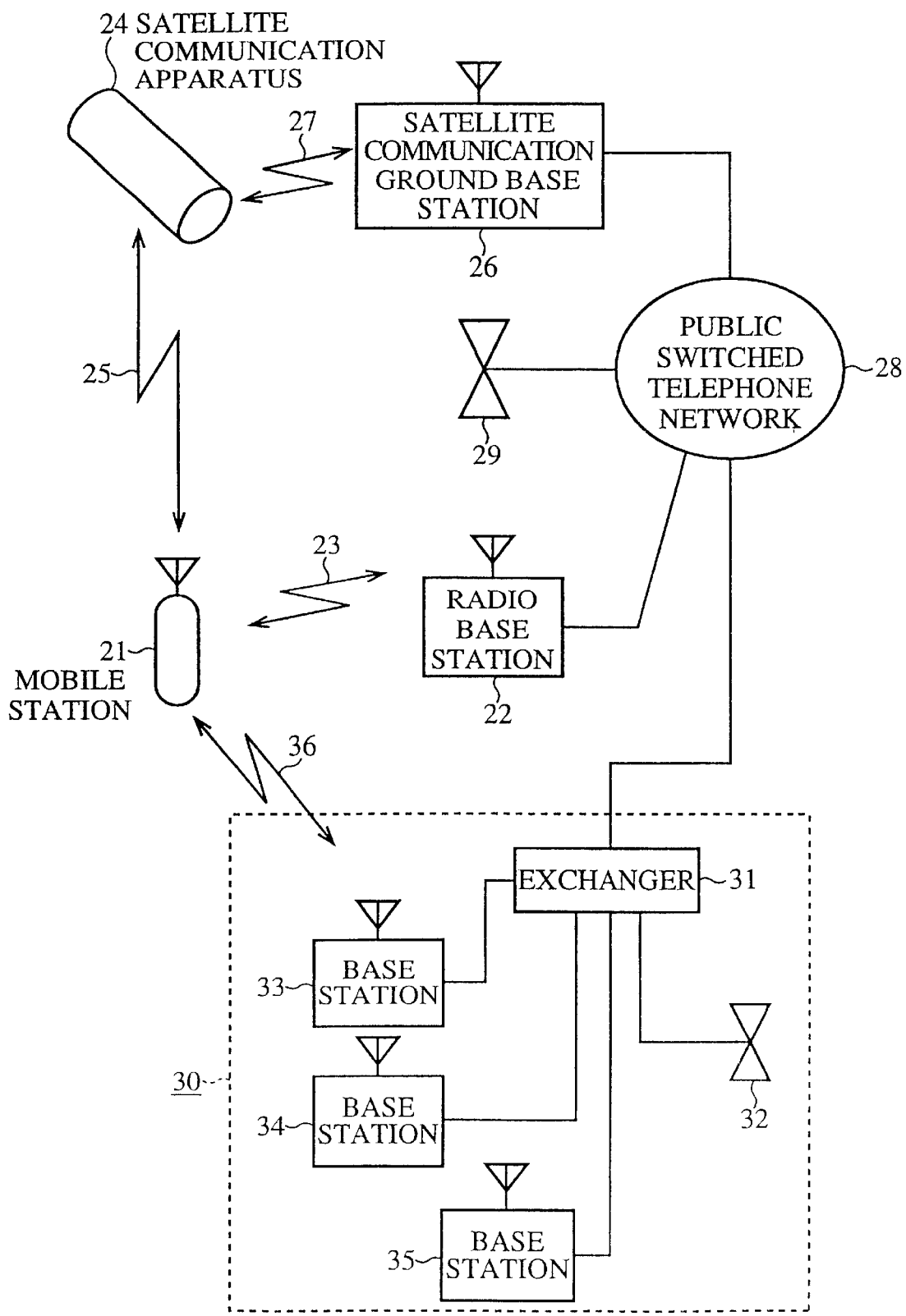
FIG. 2 is a block diagram showing a mobile communication system to which the conventional apparatus for removing shared waves is applied.
Figure 3:
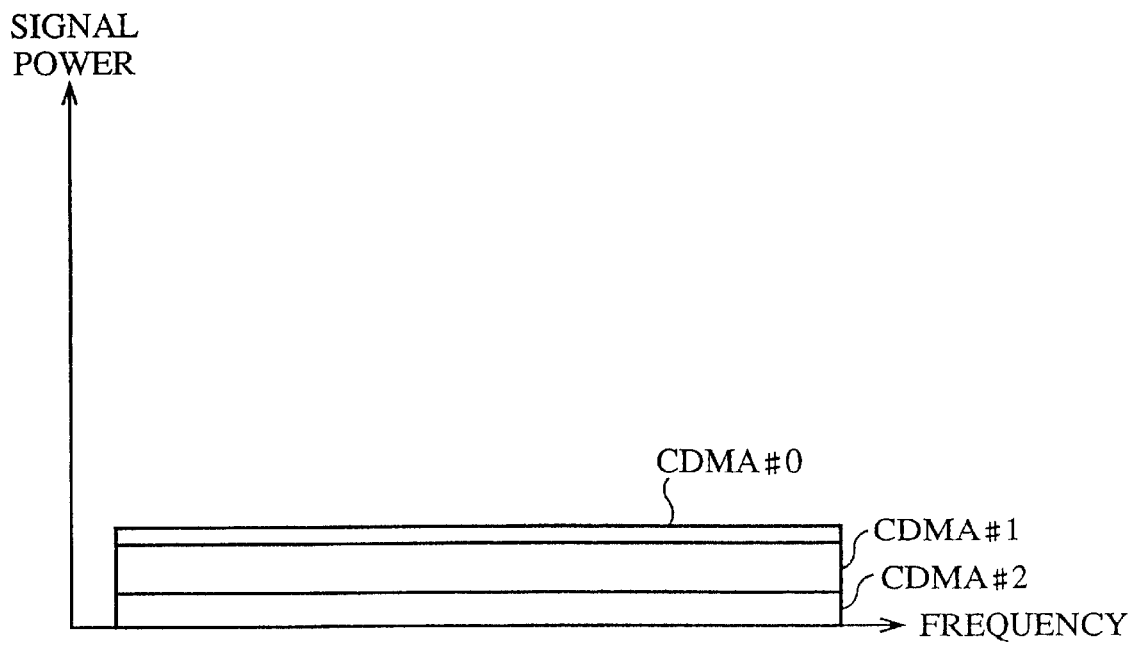
FIG. 3 is an explanatory view showing a frequency spectrum of an intermediate frequency signal.
Figure 4:
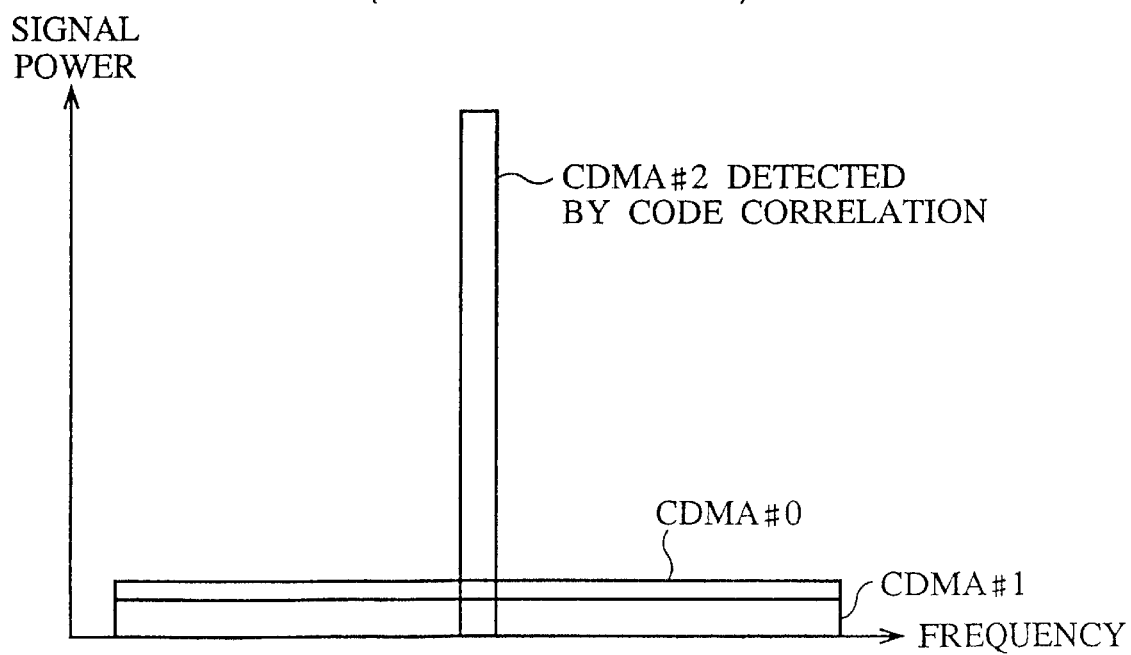
FIG. 4 is an explanatory view showing a frequency spectrum at output of a correlation detector 6.
Figure 5:
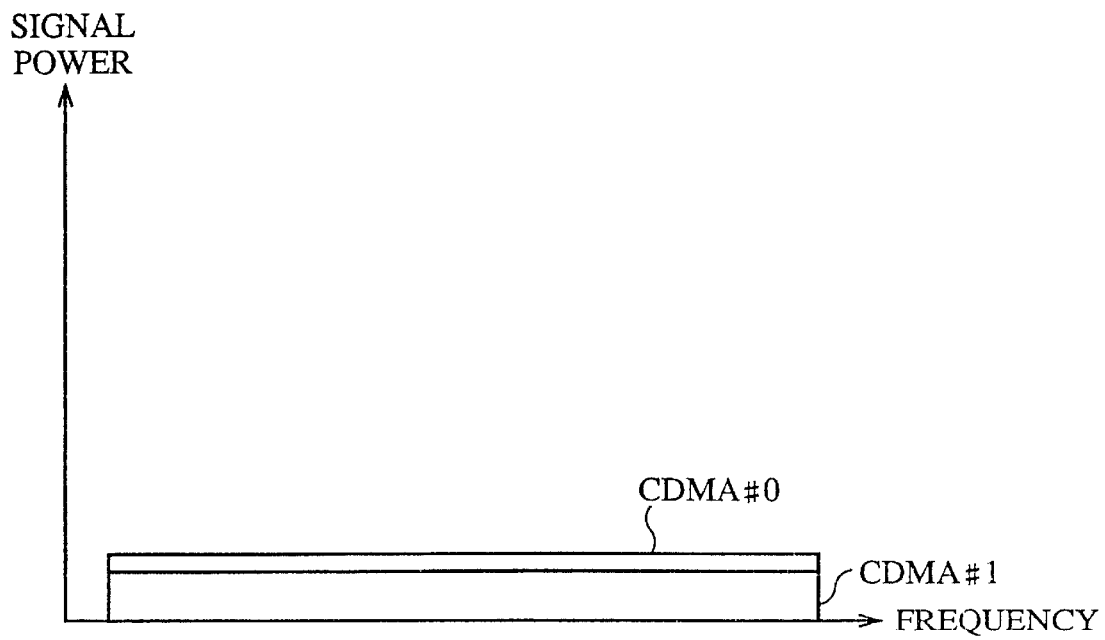
FIG. 5 is an explanatory view showing a frequency spectrum at output of a subtracter 10.
Figure 6:
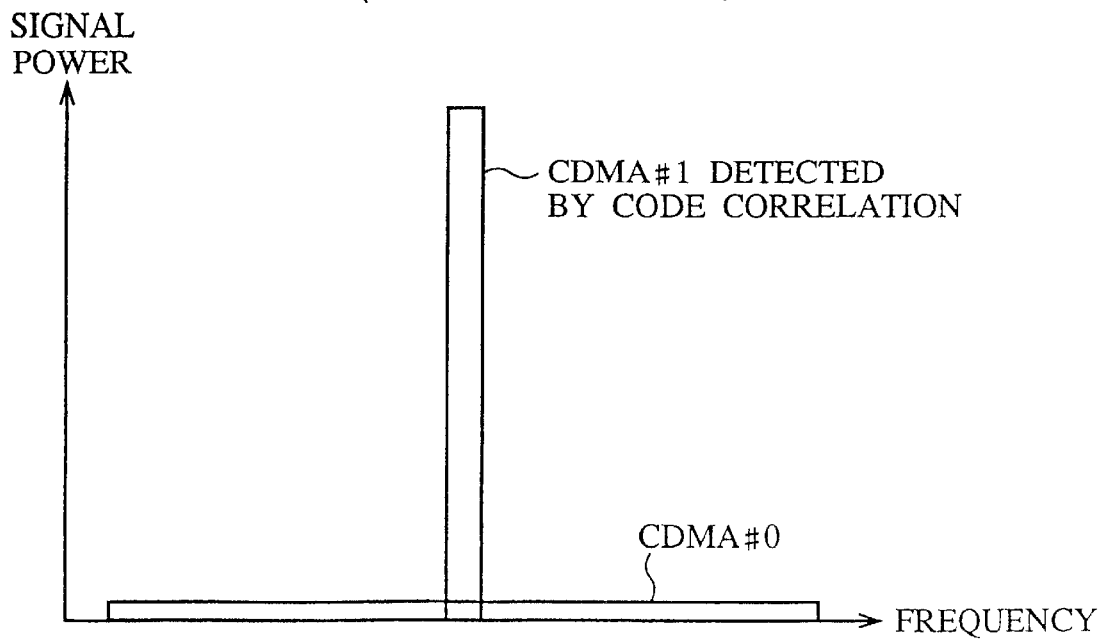
FIG. 6 is an explanatory view showing a frequency spectrum at output of a code correlator 12.
Figure 7:
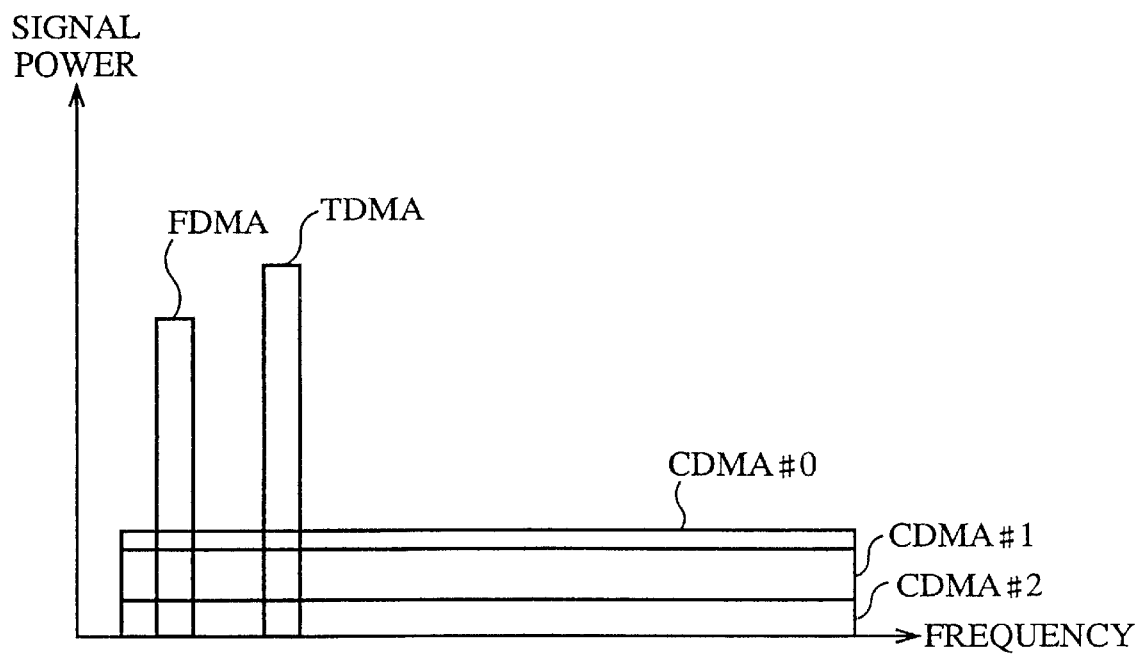
FIG. 7 is an explanatory view showing a frequency spectrum of an intermediate frequency signal.
Figure 9:
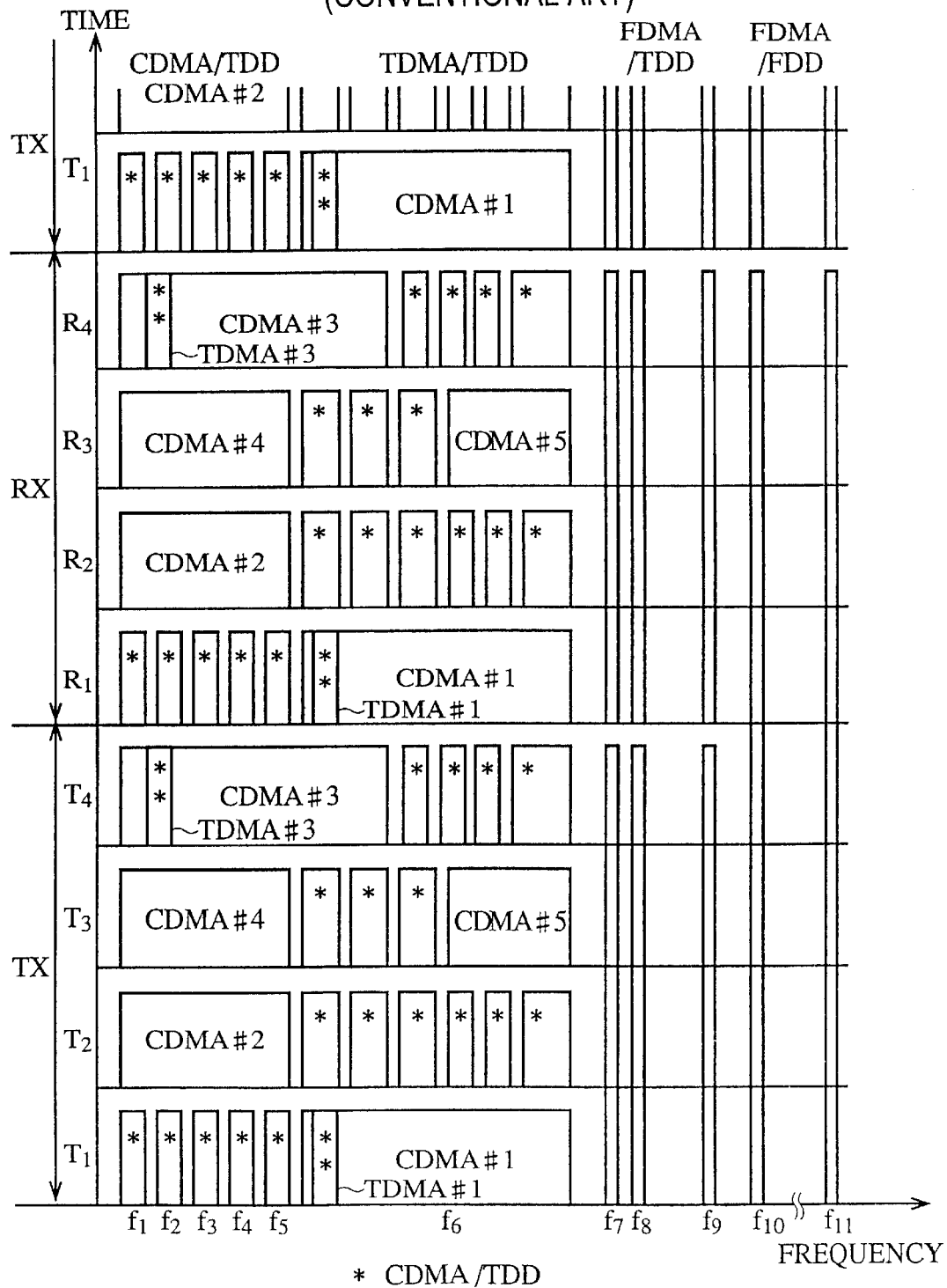
FIG. 9 is an explanatory view showing a frequency spectrum of an intermediate frequency signal.
Figure 10:
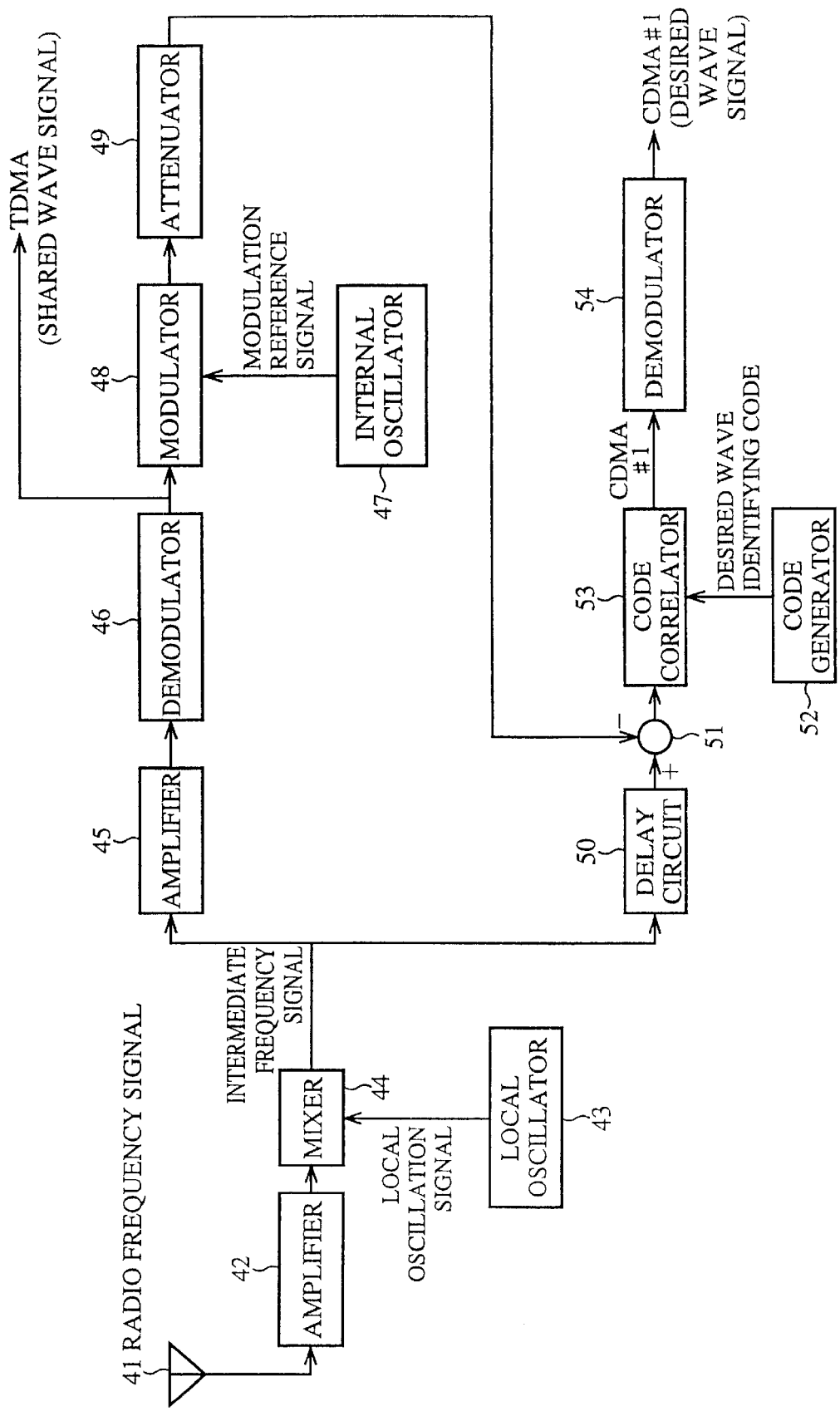
FIG. 10 is a block diagram showing a configuration of an apparatus for removing shared waves according to the embodiment 1 of the present invention.

FIG. 10 is a block diagram showing a configuration of an apparatus for removing shared waves according to the embodiment 1 of the present invention. In the drawing, reference numeral 41 means an antenna to receive a radio frequency signal, 42 is an amplifier to amplify the radio frequency signal received by the antenna 41, 43 is a local oscillator (means for extracting intermediate frequency) to generate a local oscillation signal, and 44 is a mixer (means for extracting intermediate frequency) to extract an intermediate frequency signal by mixing the local oscillation signal with the radio frequency signal amplified by the amplifier 42.

Further, reference numeral 45 means an amplifier (means for reproducing shared wave) to amplify a predetermined frequency component $f_0+nfd$ of the intermediate frequency signal extracted by the mixer 44, 46 is a demodulator (means for reproducing shared wave) to demodulate the predetermined frequency component $f_0+nfd$ amplified by the amplifier 45, 47 is an internal oscillator (means for reproducing shared wave) to generate a modulation reference signal, 48 is a modulator (means for reproducing shared wave) to modulate the predetermined frequency component $f_0+nfd$ demodulated by the demodulator 46 depending upon the information signal of the shared wave demodulated by the demodulator 46, and reproduce TDMA signal serving as a shared wave signal, and 49 is an attenuator (means for reproducing shared wave) to detect a signal level of the TDMA amplified by the amplifier 45, and conform the signal level of the TDMA serving as the shared wave signal modulated by the modulator 48 to a signal level of TDMA contained in the intermediate frequency signal. When an oscillation frequency of the local oscillator 43 is conformed to a center frequency of CDMAs #0, #1, and #2 signals, the CDMAs #0, #1, and #2 signals in an output signal from the mixer 44 serve as baseband signals. Since this case merely shows that $f_0=0$ Hz, it is to be noted that the following discussion is intended to include a case where the CDMA is processed through the baseband though the case is not described in particular.

Further, reference numeral 50 means a delay circuit to delay the intermediate frequency signal extracted by the mixer 44 for a predetermined time period, 51 is a subtracter (means for removing shared wave) to subtract the TDMA serving as the shared wave signal attenuated by the attenuator 49 from the intermediate frequency signal delayed by the delay circuit 50, 52 is a CDMA code generator (means for extracting desired wave) to generate a desired wave identifying code for identifying a desired wave, 53 is a code correlator (means for extracting desired wave) to detect CDMA#1 signal serving as a desired wave signal through code correlation from output of the subtracter 51 depending upon the desired wave identifying code generated from the CDMA code generator 52, and 54 is a demodulator to demodulate information of the CDMA#1 signal as the desired wave signal detected by the code correlator 53.

A description will now be given of the operation.

First, when the antenna 41 receives the radio frequency signal, the amplifier 42 amplifies the radio frequency signal.

Figure 11:
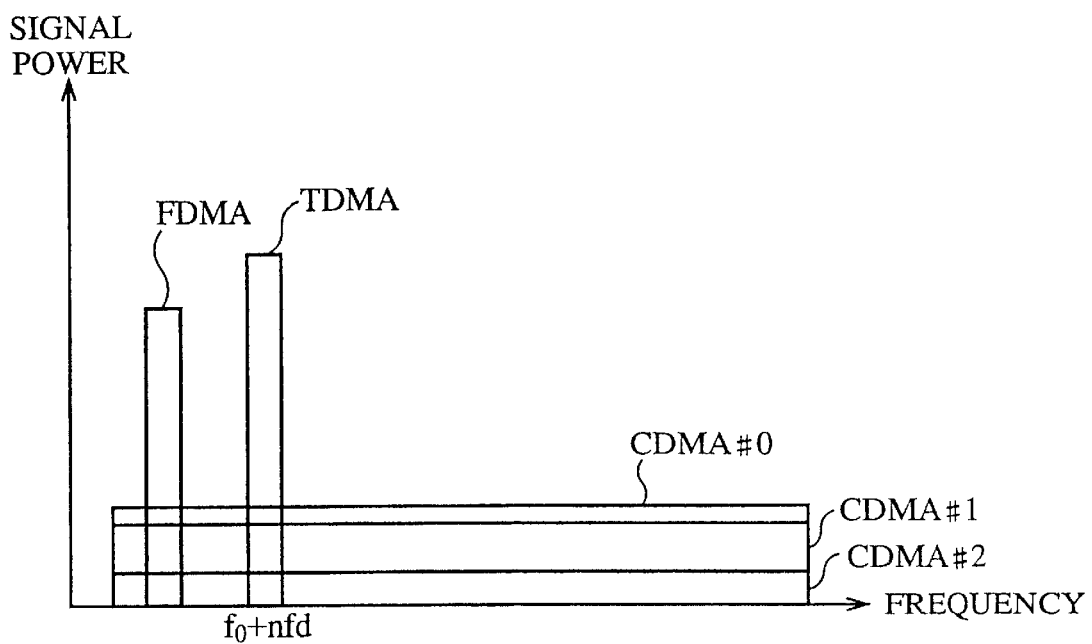
FIG. 11 is an explanatory view showing a frequency spectrum of an intermediate frequency signal.

After the amplifier 42 amplifies the radio frequency signal, the mixer 44 extracts the intermediate frequency signal by mixing the local oscillation signal generated from the local oscillator 43 with the radio frequency signal. In the embodiment, for the sake of simplicity, it must be noted that the intermediate frequency signal contains CDMA#0 signal, the CDMA#2 signal, FDMA, and TDMA as shared wave signals in addition to the CDMA#1 signal serving as the desired wave signal as shown in FIG. 11.

Figure 12:
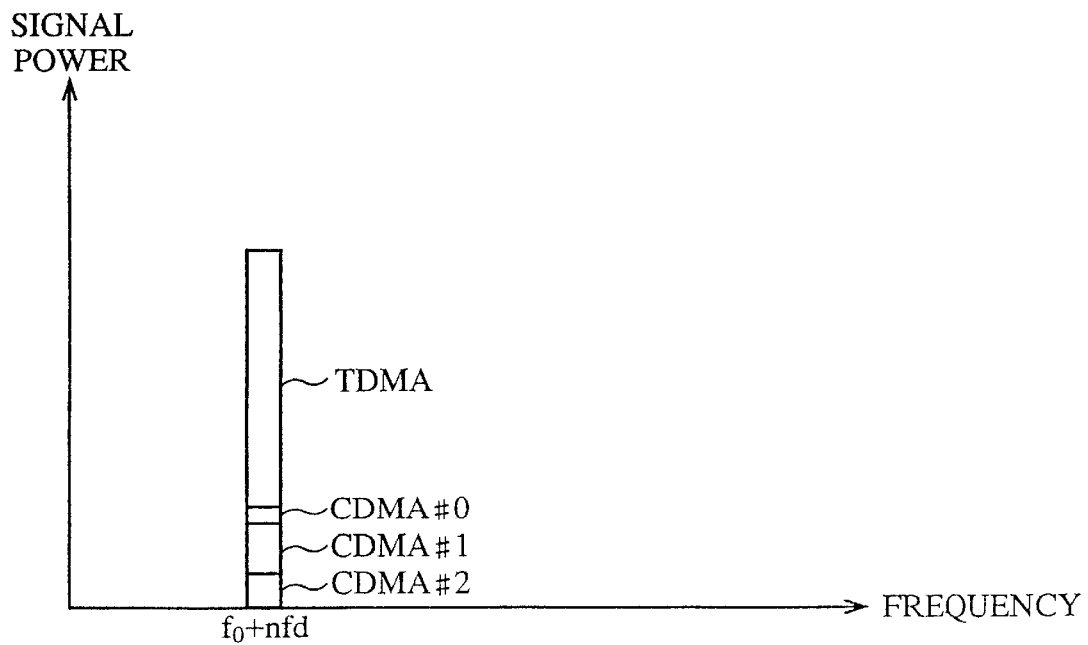
FIG. 12 is an explanatory view showing a frequency spectrum at output of an amplifier 45.

When the intermediate frequency signal is extracted by the mixer 44 in the above manner, the amplifier 45 amplifies only a signal component at a frequency of $f_0$+nfd in order to reproduce TDMA having the maximum signal power as the shared wave signal. In this case, as shown in FIG. 12, output of the amplifier 45 contains the CDMA#0 signal, the CDMA#1 signal, and the CDMA#2 signal as remaining noise components of the TDMA.

Figure 13:
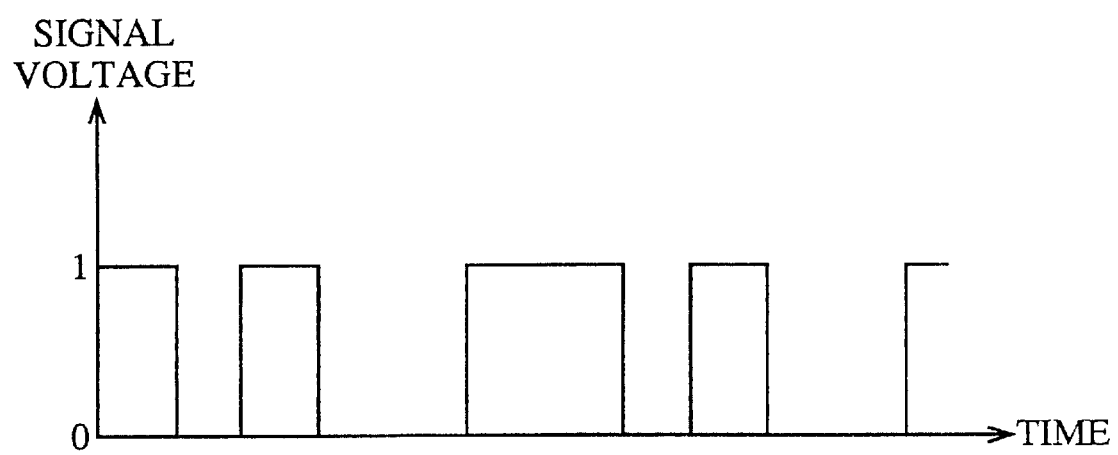
FIG. 13 is a waveform diagram showing a waveform at output of a demodulator 46.

After the amplifier 45 amplifies the signal component at the frequency of $f_0$+nfd, the demodulator 46 removes the above noise components from the signal component to demodulate the output of the amplifier 45 so as to reproduce the information of the TDMA signal serving as the shared wave signal (see FIG. 13).

When the demodulator 46 outputs the TDMA information from which the noise components are removed, the modulator 48 modulates the TDMA information depending upon the modulation reference signal.

Figure 14:
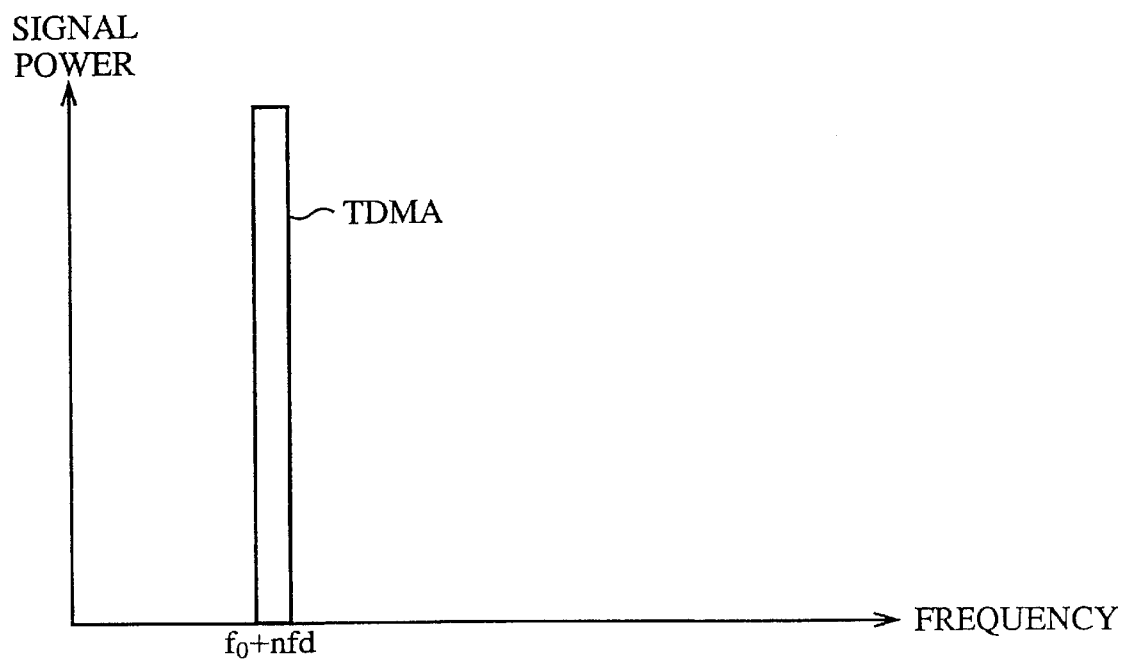
FIG. 14 is an explanatory view showing a frequency spectrum at output of a modulator 48.
Figure 15:
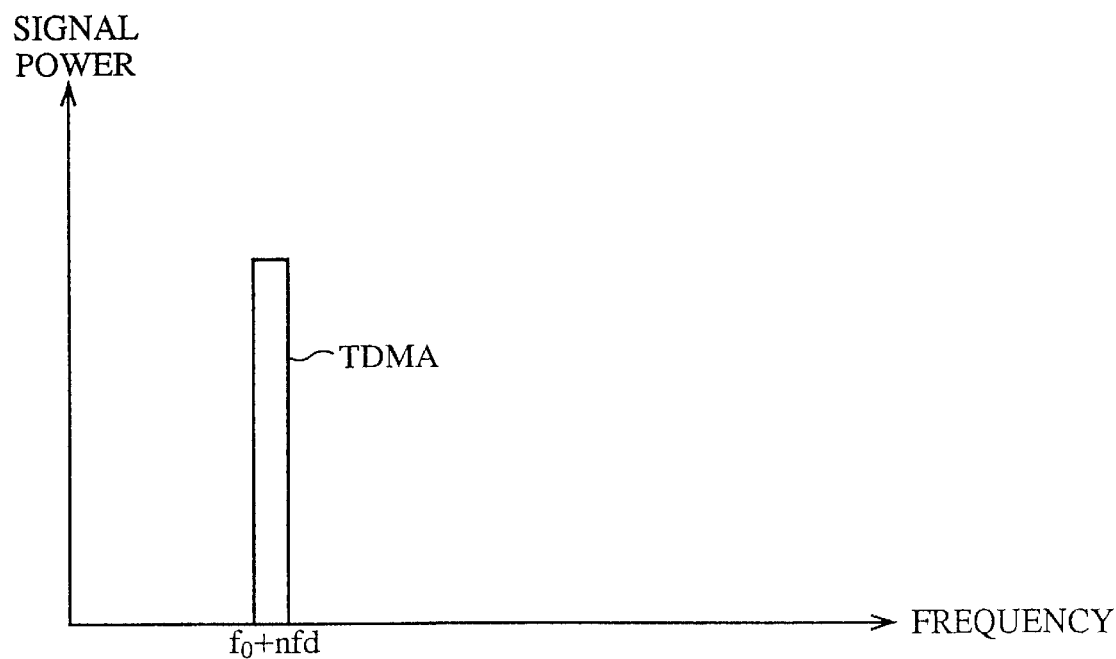
FIG. 15 is an explanatory view showing a frequency spectrum at output of an attenuator 49.

Further, the attenuator 49 conforms a signal level of the TDMA modulated by the modulator 48 to a signal level of the TDMA contained in the intermediate frequency signal outputted from the delay circuit 50, thereby improving an accuracy with which the shared wave signal is removed in the subtracter 51. For this purpose, the attenuator 49 detects the signal level of the TDMA amplified by the amplifier 45, and controls the signal level of the TDMA serving as the shared wave signal modulated by the modulator 48. Meanwhile, FIG. 14 shows the signal level of the TDMA before the control, and FIG. 15 shows the signal level of the TDMA after the control.

On the other hand, when the intermediate frequency signal is extracted by the mixer 44, the delay circuit 50 delays the intermediate frequency signal for the predetermined time period and thereafter outputs the signal to the subtracter 51 so as to overcome a difference in time between the intermediate frequency signal inputted into the subtracter 51 and the TDMA serving as the shared wave signal.

Figure 16:
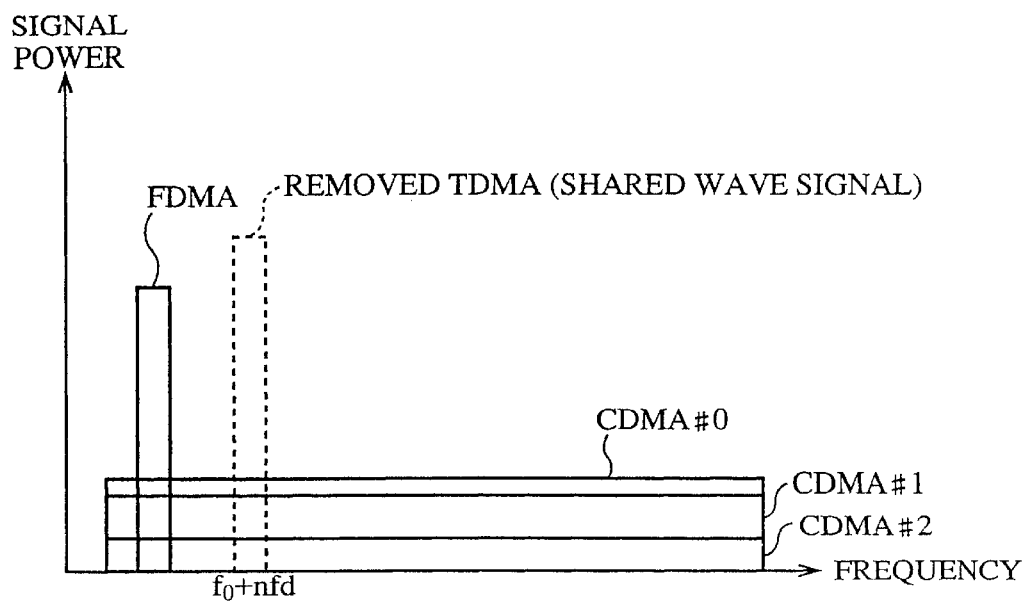
FIG. 16 is an explanatory view showing a frequency spectrum at output of a subtracter 51.

The subtracter 51 can thereby subtract the TDMA serving as the shared wave signal attenuated by the attenuator 49 from the intermediate frequency signal delayed by the delay circuit 50, and removes a shared wave signal component from the intermediate frequency signal (see FIG. 16).

Figure 17:
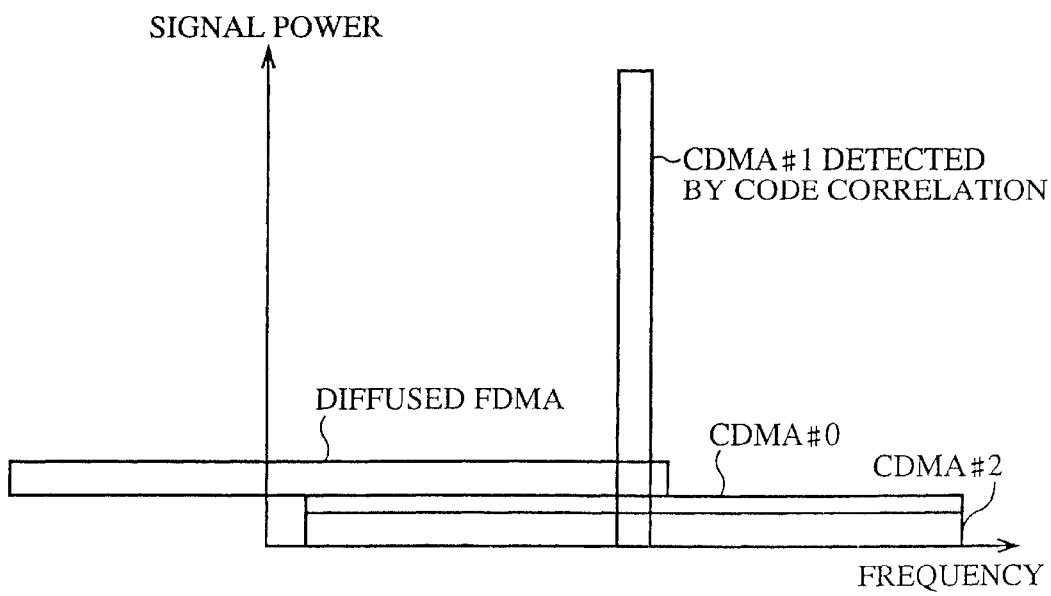
FIG. 17 is an explanatory view showing a frequency spectrum at output of a code correlator 53.
Figure 18:
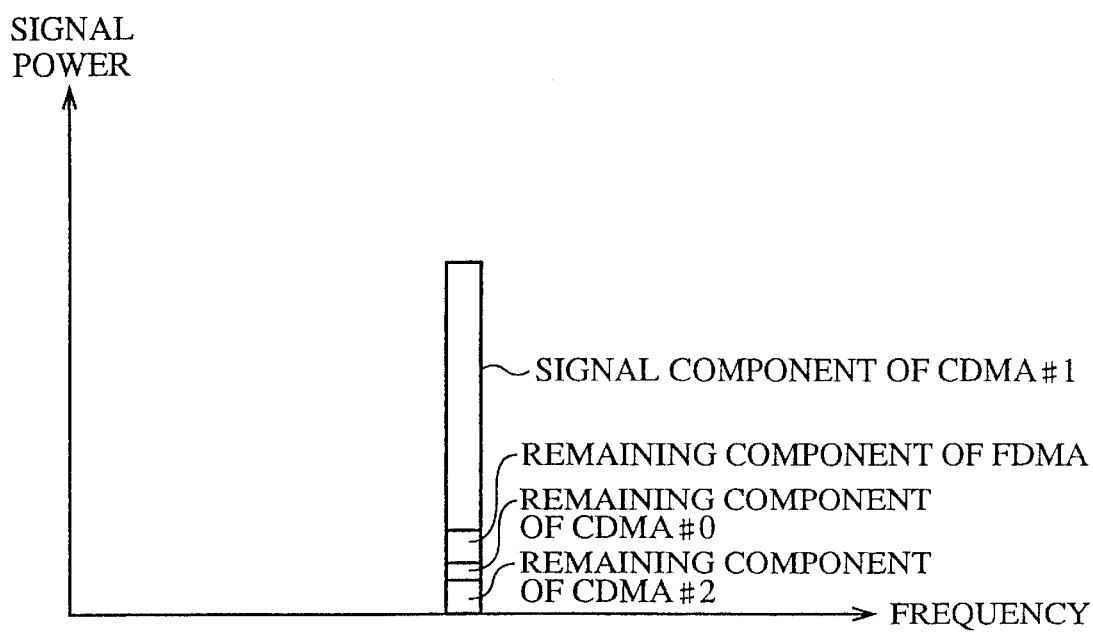
FIG. 18 is an explanatory view showing a frequency spectrum at output of an amplifier with a filter in a demodulator 54.

After the subtracter 51 subtracts the TDMA serving as the shared wave signal from the intermediate frequency signal, the code correlator 53 detects the CDMA#1 signal serving as the desired wave signal through the code correlation from the intermediate frequency signal depending upon the desired wave identifying code generated from the CDMA code generator 52. That is, as shown in FIG. 17, the CDMA#1 signal serving as the desired wave signal is extracted by being correlated and regarding the diffused FDMA signal contained in the intermediate frequency signal as the noise component (the FDMA being diffused with a center frequency of the FDMA as a center to equally extend toward both sides), and regarding the CDMA#0 signal and the CDMA#2 signal as the noise components. In this case, as shown in FIG. 18, the extracted desired wave signal contains the FDMA, the CDMA#0 signal, and the CDMA#2 signal as the noise components.

Figure 19:
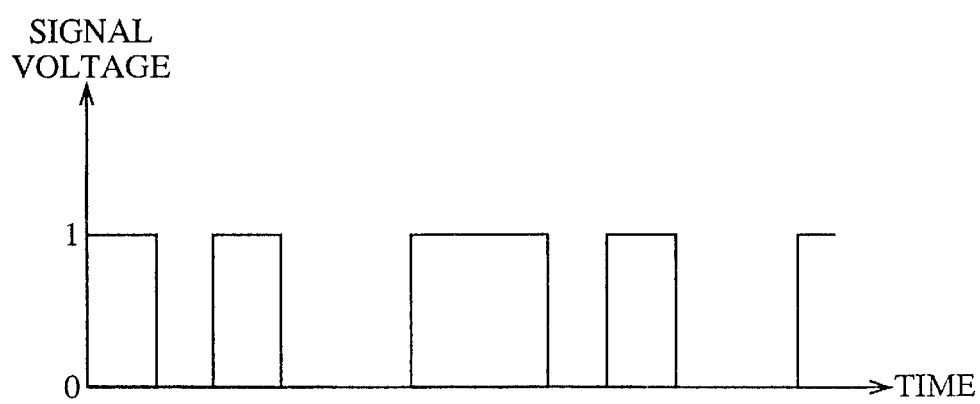
FIG. 19 is a waveform diagram showing a waveform at output of the demodulator 54.

Then, the demodulator 54 demodulates output of the code correlator 53, thereby extracting only information of the CDMA#1 signal serving as the desired wave signal (see FIG. 19), resulting in the completion of a series of processing.

As set forth above, according to the embodiment 1, the predetermined frequency component $f_0$+nfd of the intermediate frequency signal is amplified, and thereafter demodulated and modulated to reproduce the shared wave signal. Thus, even when the intermediate frequency signal contains the TDMA as the shared wave signal, it is possible to reproduce the TDMA serving as the shared wave signal from the intermediate frequency signal. As a result, there is an effect in that the information of the CDMA#1 signal serving as the desired wave signal can be extracted with high accuracy by removing the TDMA serving as the shared wave signal from the intermediate frequency signal.

Embodiment 2

Figure 20:
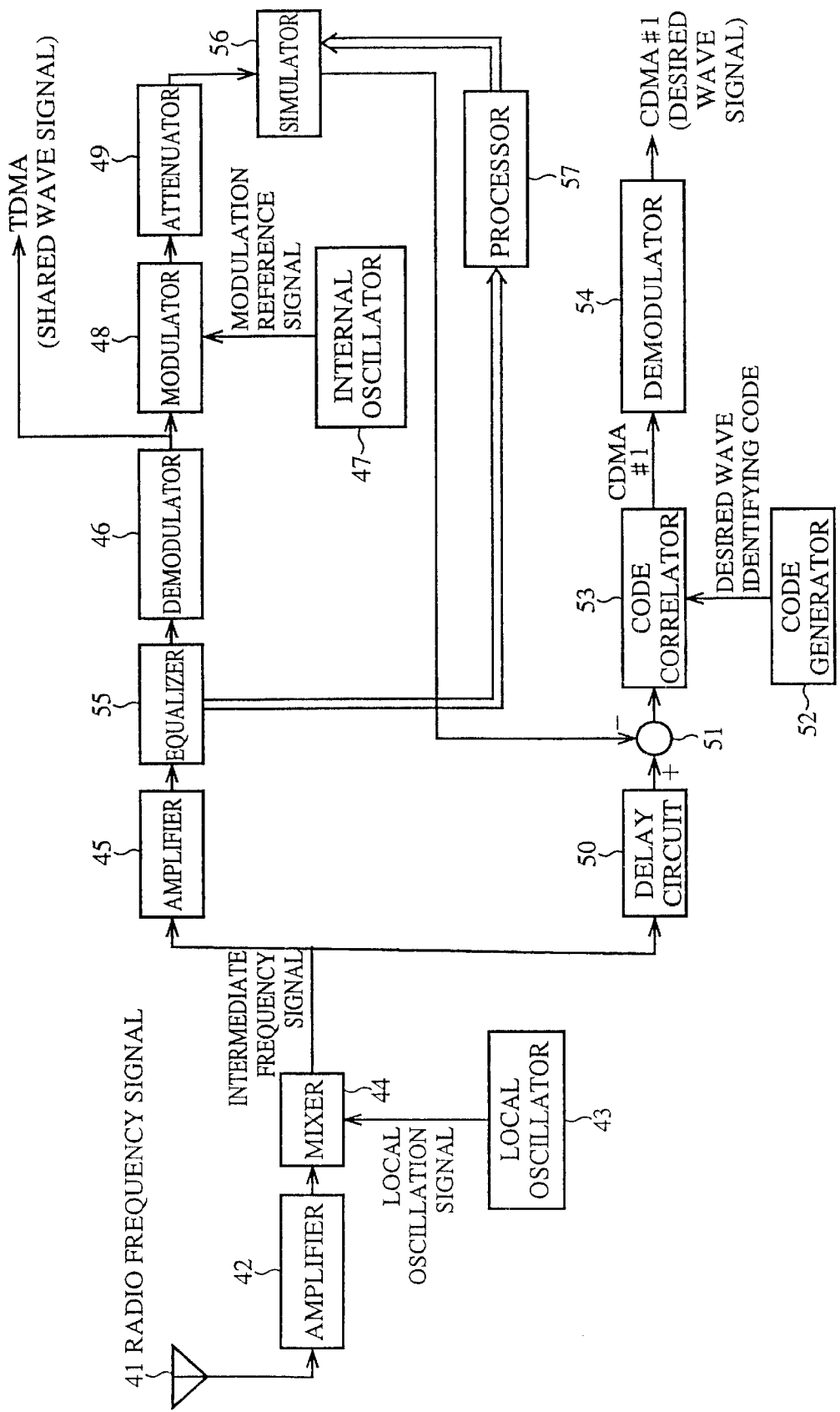
FIG. 20 is a block diagram showing a configuration of an apparatus for removing shared waves according to the embodiment 2 of the present invention.

FIG. 20 is a block diagram showing a configuration of an apparatus for removing shared waves according to the embodiment 2 of the present invention. In the drawing, the same reference numerals are used for component parts identical with or equivalent to those shown in FIG. 10, and descriptions thereof are omitted.

Reference numeral 55 means an equalizer (means for extracting shared wave) to compensate for transmission path distortion of a shared wave signal with propagation through a plurality of paths, 56 is a simulator (means for reproducing shared wave) to provide the transmission path distortion for TDMA signal serving as a shared wave signal whose signal level is controlled by an attenuator 49, and 57 is a processor (means for reproducing shared wave) to find a correlation function T according to an inverse correlation function $T^{-1}$ of distortion compensation used in the equalizer 55, and provide the correlation function T for the simulator 56.

A description will now be given of the operation.

A structure is identical with that in the embodiment 1 except the equalizer 55, the simulator 56, and the processor 57. Therefore, a description will chiefly be given of the equalizer 55, the simulator 56, and the processor 57.

First, in a radio frequency signal, as shown in FIG. 21($a$), the transmission path distortion may be caused with the propagation through the plurality of paths as described above. In such a case, the transmission path distortion is naturally caused in TDMA (or FDMA) serving as a shared wave signal. If the TDMA serving as the shared wave signal is demodulated by a demodulator 46 without compensating for the transmission path distortion as in the embodiment 1, the modulator 48 may cause a modulation code error due to a noise component of a distorted waveform. Consequently, an inaccurately reproduced waveform of the TDMA is outputted to the subtracter 51.

Hence, in the embodiment 2, when an amplifier 45 amplifies a signal component at a frequency of $f_0$+nfd, that is, the TDMA serving as the shared wave signal, the equalizer 55 compensates for the distorted waveform of the TDMA by using the inverse correlation function $T^{-1}$ of distortion compensation. FIG. 21($b$) shows a waveform of a shared wave signal after the distortion compensation.

The demodulator 46 can thereby demodulate the TDMA having an undistorted waveform so that the modulator 48 can modulate the TDMA serving as the shared wave signal without causing the modulation code error. However, the waveform of the modulated TDMA has no distortion. If the TDMA is directly outputted to the subtracter 51, there is a difference in waveform between the modulated TDMA and the TDMA contained in the intermediate frequency signal outputted from a delay circuit 50 to the subtracter 51 (the TDMA having the transmission path distortion).

Thus, in order to provide the same transmission path distortion for the reproduced TDMA outputted from the attenuator 49, the simulator 56 provides the transmission path distortion for the TDMA serving as the shared wave signal by using the correlation function T. Thereby, the waveform of the TDMA serving as the shared wave signal becomes a waveform having the transmission path distortion as shown in FIG. 21(*a*).

As is apparent from the foregoing, according to the embodiment 2, after the compensation for the shared wave signal contained in the intermediate frequency signal, the shared wave signal is demodulated and modulated to provide the transmission path distortion for the modulated shared wave signal. Consequently, even when the transmission path distortion occurs in the radio frequency signal with the propagation through the plurality of paths, it is possible to remove the TDMA serving as the shared wave signal from the intermediate frequency signal with high accuracy. As a result, there is an effect in that it is possible to extract the information of the CDMA#1 signal serving as the desired wave signal with high accuracy.

Embodiment 3

Figure 22:
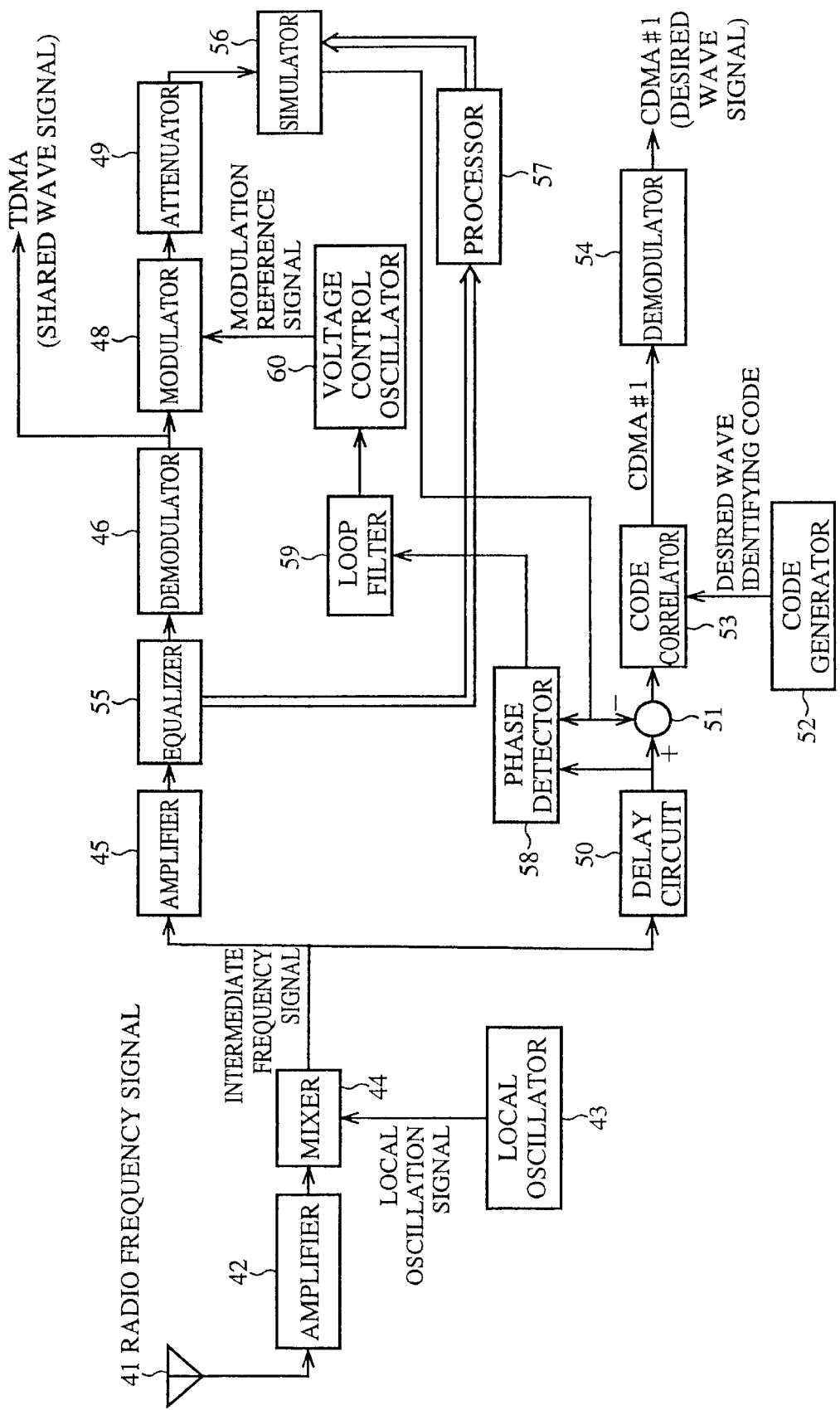
FIG. 22 is a block diagram showing a configuration of an apparatus for removing shared waves according to the embodiment 3 of the present invention.

FIG. 22 is a block diagram showing a configuration of an apparatus for removing shared waves according to the embodiment 3 of the present invention. In the drawing, the same reference numerals are used for component parts identical with or equivalent to those shown in FIG. 20, and descriptions thereof are omitted.

Reference numeral 58 means a phase detector (phase detecting means) to detect a phase difference between an intermediate frequency signal delayed by a delay circuit 50 and a shared wave signal outputted from a simulator 56, 59 is a loop filter to remove a higher harmonic component contained in the phase difference detected by the phase detector 58, and 60 is a voltage control oscillator (means for reproducing shared wave) to output a modulation reference signal depending upon output of the loop filter 59.

A description will now be given of the operation.

In the embodiments 1 and 2, phase synchronization between the intermediate frequency signal and the shared wave signal is performed only by delaying the intermediate frequency signal by the delay circuit 50. However, for example, a demodulator 46 and a modulator 48 do not always have the same throughput speed so that phase synchronization may not accurately be realized in this method.

However, according to the embodiment 3, it is possible to continuously realize accurate phase synchronization.

First, the phase detector 58 detects the phase difference between the intermediate frequency signal delayed by the delay circuit 50 and the shared wave signal outputted from the simulator 56.

After the phase detector 58 detects the phase difference, the loop filter 59 removes the higher harmonic component contained in the phase difference, and outputs the phase difference to the voltage control oscillator 60.

Thereby, the voltage control oscillator 60 typically outputs a modulation reference signal with a center frequency of $f_0+nfd$, and controls the modulation reference signal depending upon the phase difference for synchronization such that the intermediate frequency signal and the shared wave signal can be in phase.

As is apparent from the foregoing, according to the embodiment 3, the phase of the reproduced shared wave signal is controlled depending upon the result of detection of the phase detector 58. It is possible to improve an accuracy with which the shared wave signal contained in the intermediate frequency signal is removed, resulting in an effect in that information of CDMA#1 signal serving as a desired wave signal can be extracted with high accuracy.

Embodiment 4

Figure 23:
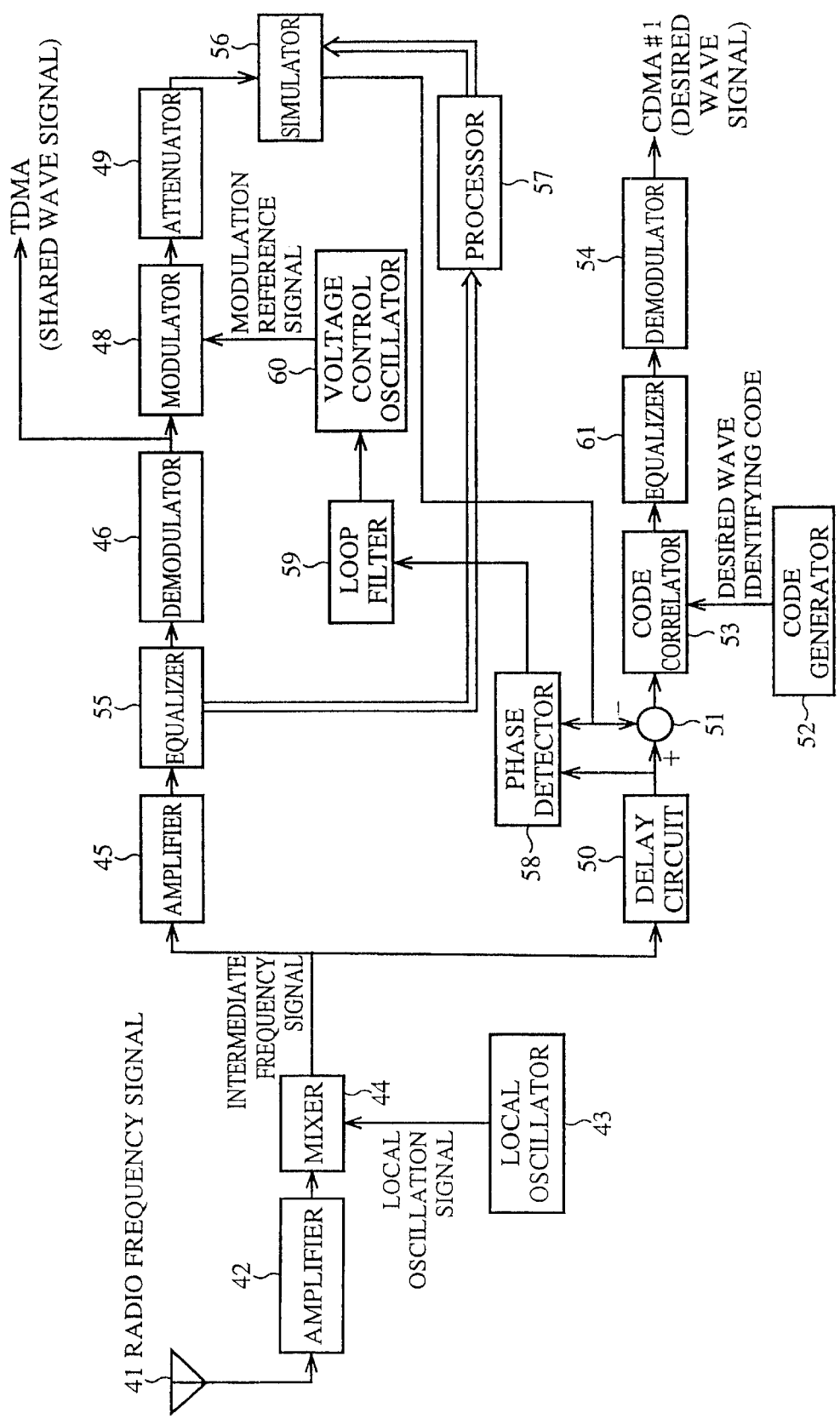
FIG. 23 is a block diagram showing a configuration of an apparatus for removing shared waves according to the embodiment 4 of the present invention.

FIG. 23 is a block diagram showing a configuration of an apparatus for removing shared waves according to the embodiment 4 of the present invention. In the drawing, the same reference numerals are used for component parts identical with or equivalent to those shown in FIG. 22, and descriptions thereof are omitted.

Reference numeral 61 means an equalizer (means for extracting desired wave) to compensate for transmission path distortion of a desired wave signal with propagation through a plurality of paths.

A description will now be given of the operation.

In the embodiments 2 and 3, compensation is made for the transmission path distortion of the shared wave signal. However, it is to be noted that the equalizer 61 may compensate for the transmission path distortion of CDMA#1 signal serving as the desired wave signal by using an inverse correlation function of distortion compensation calculated by the equalizer 61 itself.

Thereby, even when the transmission path distortion is caused in a radio frequency signal with the propagation through the plurality of paths, it is possible to compensate for waveform distortion of the CDMA#1 signal serving as the desired wave signal. As a result, there is an effect in that information of the CDMA#1 signal serving as the desired wave signal can be extracted with high accuracy.

Embodiment 5

In the embodiments 1 to 4, the TDMA is reproduced and removed as the shared wave signal. However, it must be noted that FDMA may be reproduced and removed as the shared wave signal to provide the same effects as those in the embodiments 1 to 4.

Embodiment 6

Figure 24:
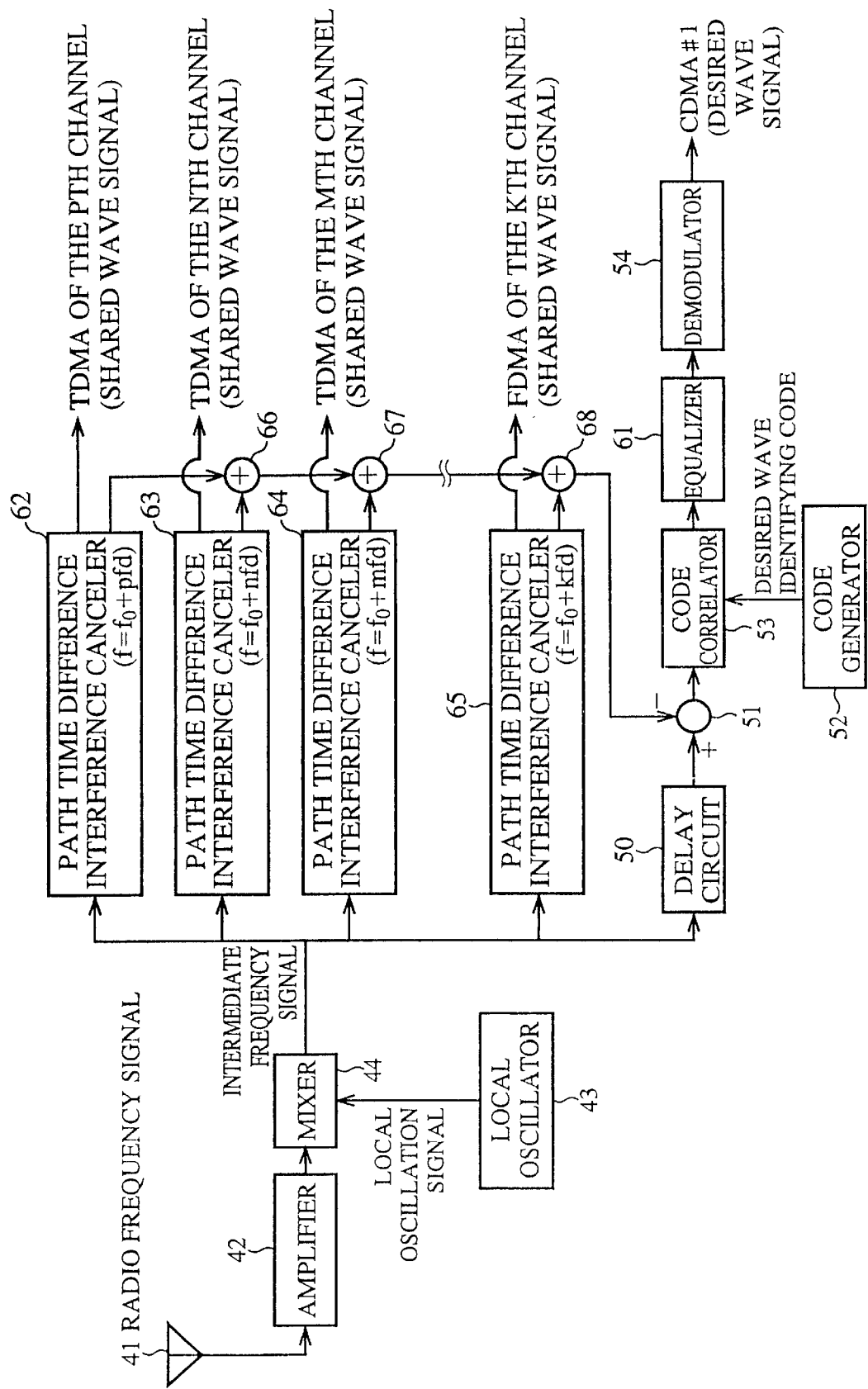
FIG. 24 is a block diagram showing a configuration of an apparatus for removing shared waves according to the embodiment 6 of the present invention.

FIG. 24 is a block diagram showing a configuration of an apparatus for removing shared waves according to the embodiment 6 of the present invention. In the drawing, the same reference numerals are used for component parts identical with or equivalent to those shown in FIG. 10, and descriptions thereof are omitted.

Reference numerals 62 to 65 mean cancelers to reproduce different shared wave signals, which are means for reproducing shown in any one of the embodiments 1 to 5, and 7. Reference numerals 66 to 68 means adders (means for removing shared wave) to add shared wave signals outputted from the cancelers 62 to 65.

A description will now be given of the operation.

In the embodiments 1 to 5, the one shared wave signal is reproduced and removed. However, it is to be noted that the structure as shown in FIG. 24 may be provided when an intermediate frequency signal contains many shared wave signals having high signal power.

That is, the plurality of cancelers 62 to 65 are mounted to reproduce different shared wave signals, and the shared wave signals such as TDMA reproduced by the cancelers 62 to 65 are added by the adders 66 to 68. Subsequently, the result of addition is outputted to a subtracter 51. It is thereby possible to remove the plurality of shared wave signals contained in the intermediate frequency signal.

Embodiment 7

Figure 25:
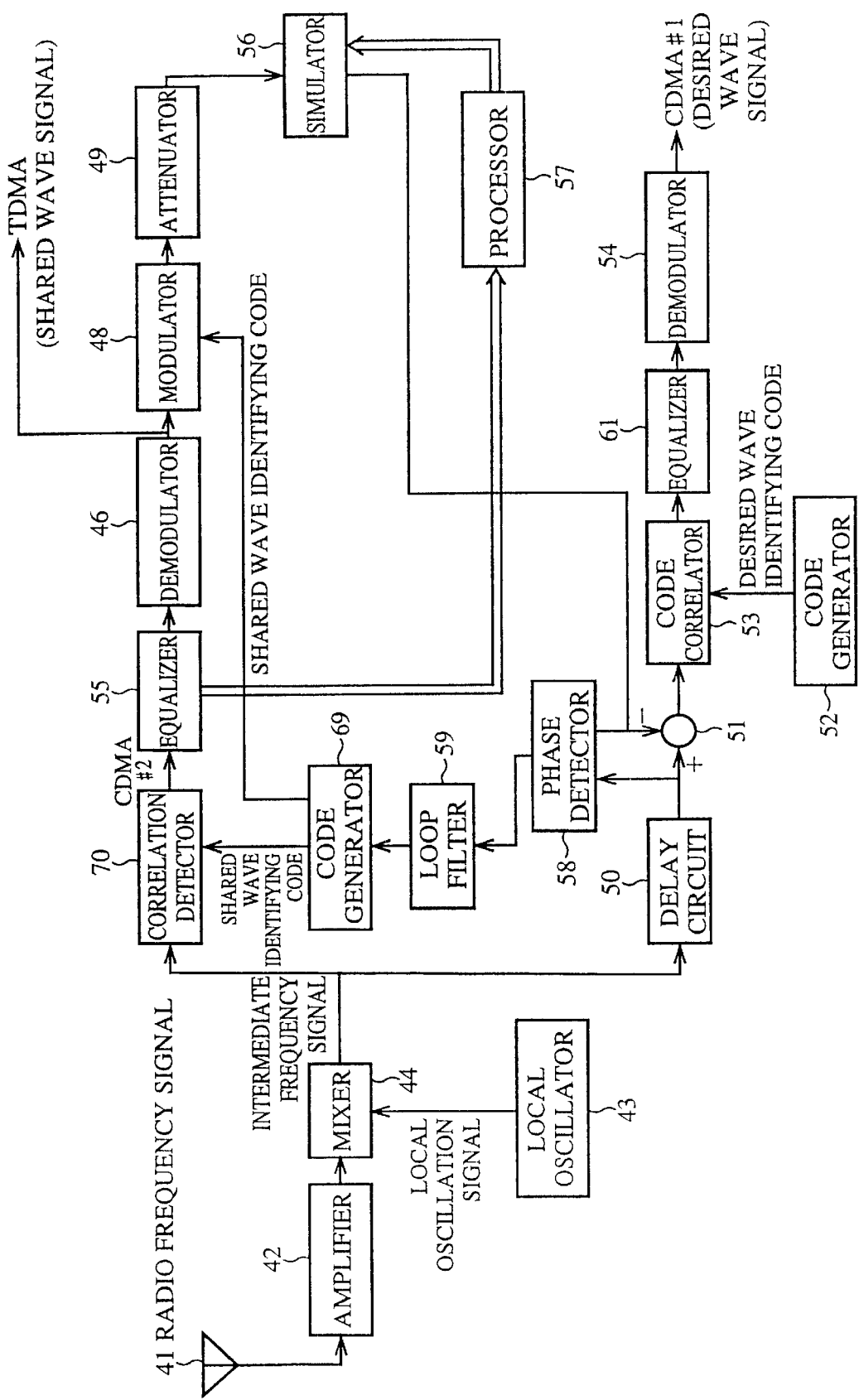
FIG. 25 is a block diagram showing a configuration of an apparatus for removing shared waves according to the embodiment 7 of the present invention.

FIG. 25 is a block diagram showing a configuration of an apparatus for removing shared waves according to the embodiment 7 of the present invention. In the drawing, the same reference numerals are used for component parts identical with or equivalent to those shown in FIG. 23, and descriptions thereof are omitted.

Reference numeral 69 means a CDMA code generator (means for reproducing) to generate a shared wave identifying code for identifying a shared wave, and 70 is a correlation detector (means for reproducing shared wave) to detect CDMA#2 signal serving as a shared wave signal through code correlation from an intermediate frequency signal depending upon the shared wave identifying code generated from the CDMA code generator 69.

A description will now be given of the operation.

In the embodiments 1 to 6, the TDMA or the FDMA is reproduced as the shared wave signal. However, it is to be noted that the structure as shown in FIG. 25 may be provided when a radio frequency signal has transmission path distortion with propagation through a plurality of paths, and the CDMA#2 signal must be removed as the shared wave signal though, for example, the TDMA contained in an intermediate frequency signal does not have very high signal power.

Figure 26:
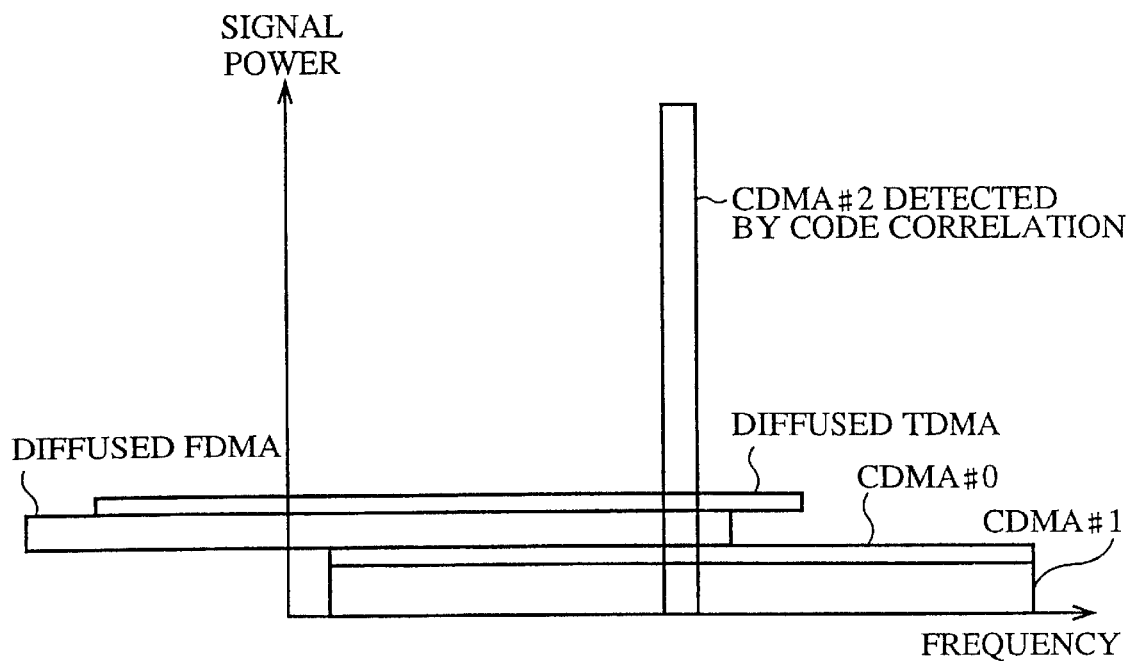
FIG. 26 is an explanatory view showing a frequency spectrum at output of a correlation detector 70.

That is, the correlation detector 70 detects the CDMA#2 signal serving as the shared wave signal through the code correlation from the intermediate frequency signal depending upon the shared wave identifying code generated from the code generator 69. More specifically, as shown in FIG. 26, the CDMA#2 signal serving as the shared wave signal is reproduced by diffusing and regarding the TDMA signal and the FDMA signal contained in the intermediate frequency signal as noise components (the TDMA and the FDMA being diffused with a center frequency of the TDMA and the FDMA as a center to equally extend toward their both sides), and regarding CDMA#0 signal and CDMA#1 signal as noise components.

Figure 27:
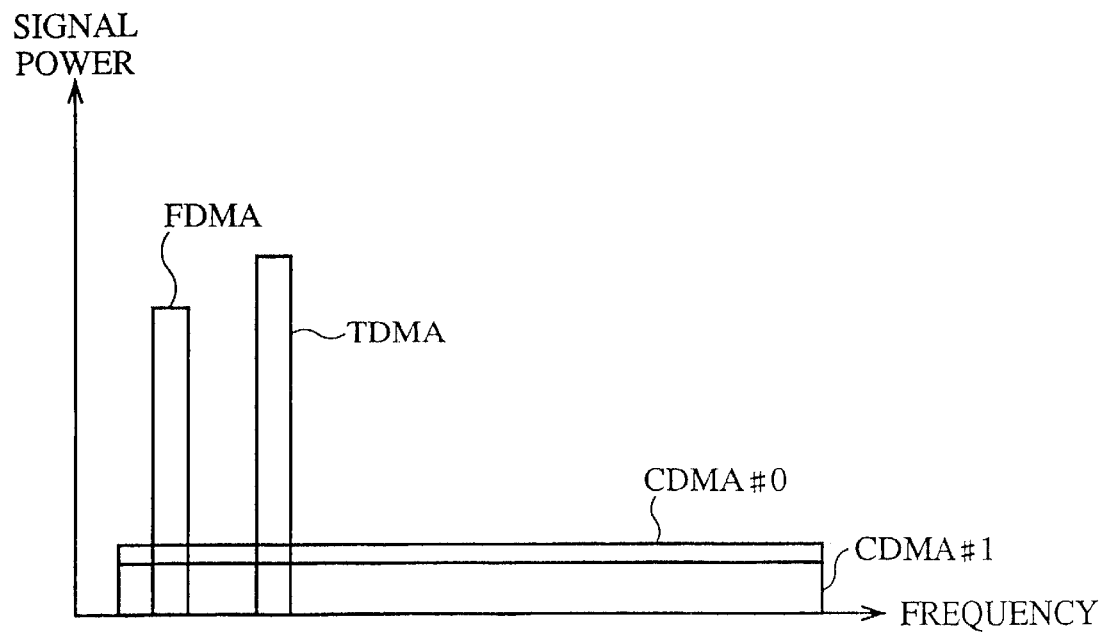
FIG. 27 is an explanatory view showing a frequency spectrum at output of a subtracter 51.

Thereby, the CDMA#2 signal to which the transmission path distortion is added is outputted from a simulator 56 to a subtracter 51. As in the embodiments 1 to 6, the subtracter 51 subtracts the CDMA#2 signal serving the shared wave signal from the intermediate frequency signal, thereby removing the CDMA#2 signal from the intermediate frequency signal (see FIG. 27).

Figure 28:
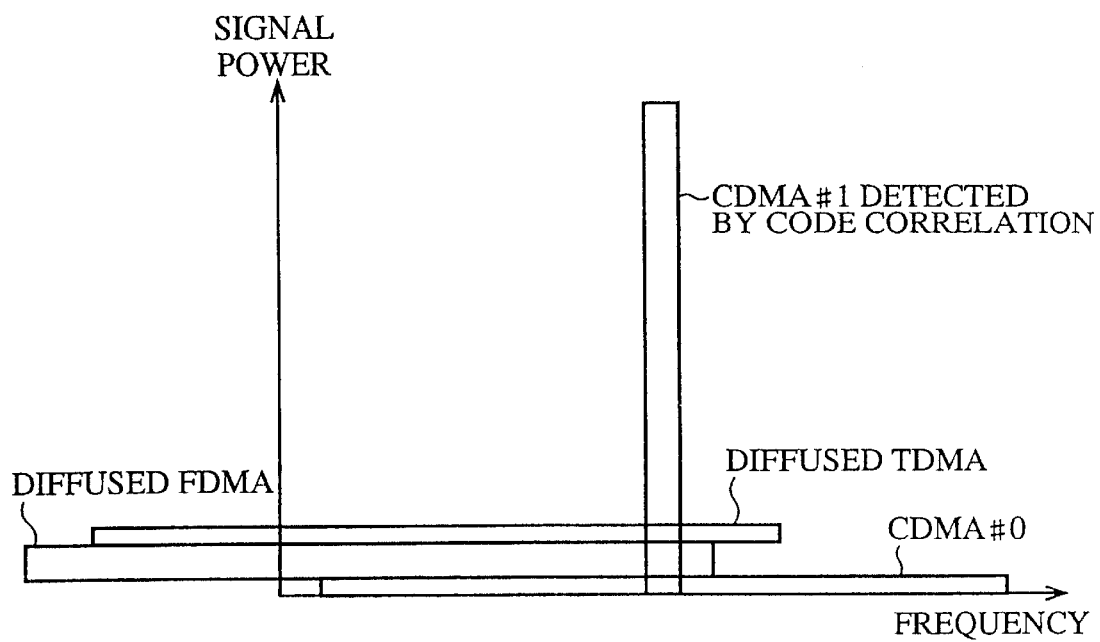
FIG. 28 is an explanatory view showing a frequency spectrum at output of a code correlator 53.

After the subtracter 51 subtracts the CDMA#2 signal serving the shared wave signal from the intermediate frequency signal, the code correlator 53 detects the CDMA#1 signal serving as a desired wave signal through the code correlation from the intermediate frequency signal depending upon a desired wave identifying code generated from a CDMA code generator 52 as in the embodiment 1 or the like. That is, as shown in FIG. 28, the CDMA#1 signal serving as the desired wave signal is extracted by diffusing and regarding the TDMA signal and the FDMA signal contained in the intermediate frequency signal as the noise components, and regarding the CDMA#0 signal as the noise component.

As is apparent from the foregoing, according to the embodiment 7, the shared wave signal is reproduced by diffusing, for example, the desired wave signal contained in the intermediate frequency signal, and compensation is made for the transmission path distortion of the shared wave signal. On the other hand, the shared wave signal compensated for the transmission path distortion is demodulated and modulated, and the transmission path distortion is provided for the demodulated and modulated shared wave signal. Thus, even when the transmission path distortion is caused in the radio frequency signal with the propagation through the plurality of paths, it is possible to remove the shared wave signal from the intermediate frequency signal with high accuracy. As a result, there is an effect in that the desired wave signal can be extracted with high accuracy.

Embodiment 8

Figure 29:
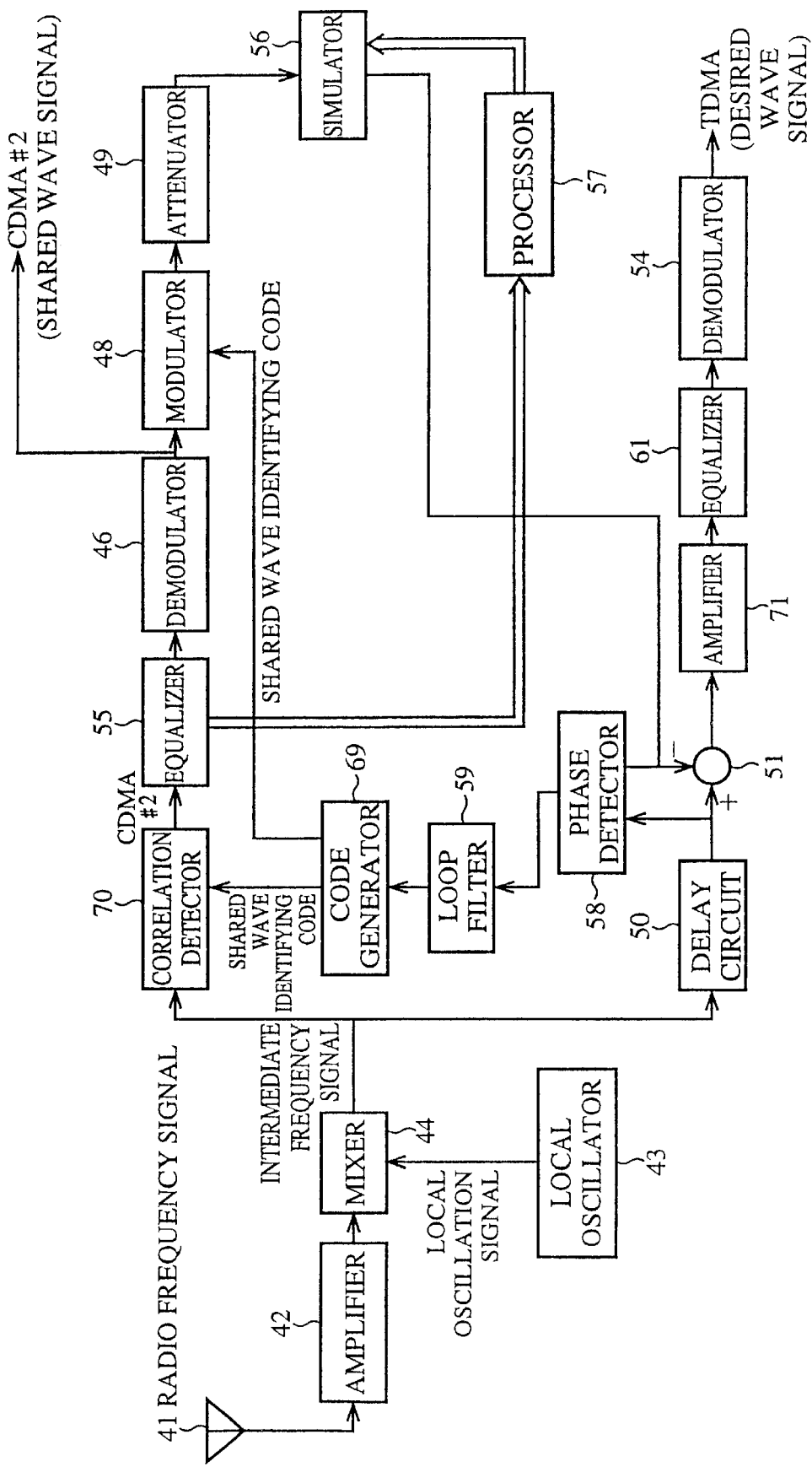
FIG. 29 is a block diagram showing a configuration of an apparatus for removing shared waves according to the embodiment 8 of the present invention.

FIG. 29 is a block diagram showing a configuration of an apparatus for removing shared waves according to the embodiment 8 of the present invention. In the drawing, the same reference numerals are used for component parts identical with or equivalent to those shown in FIG. 25, and descriptions thereof are omitted.

Reference numeral 71 means an amplifier (means for extracting desired wave) to amplify a predetermined frequency component $f_0+nfd$ of an intermediate frequency signal from which a shared wave signal is removed by a subtracter 51 so as to extract TDMA serving as a desired wave signal.

A description will now be given of the operation.

In the embodiment 7, the CDMA#1 signal serves as the desired wave signal. However, it is to be noted that the structure as shown in FIG. 29 may be provided when the TDMA serves as the desired wave signal.

Figure 30:
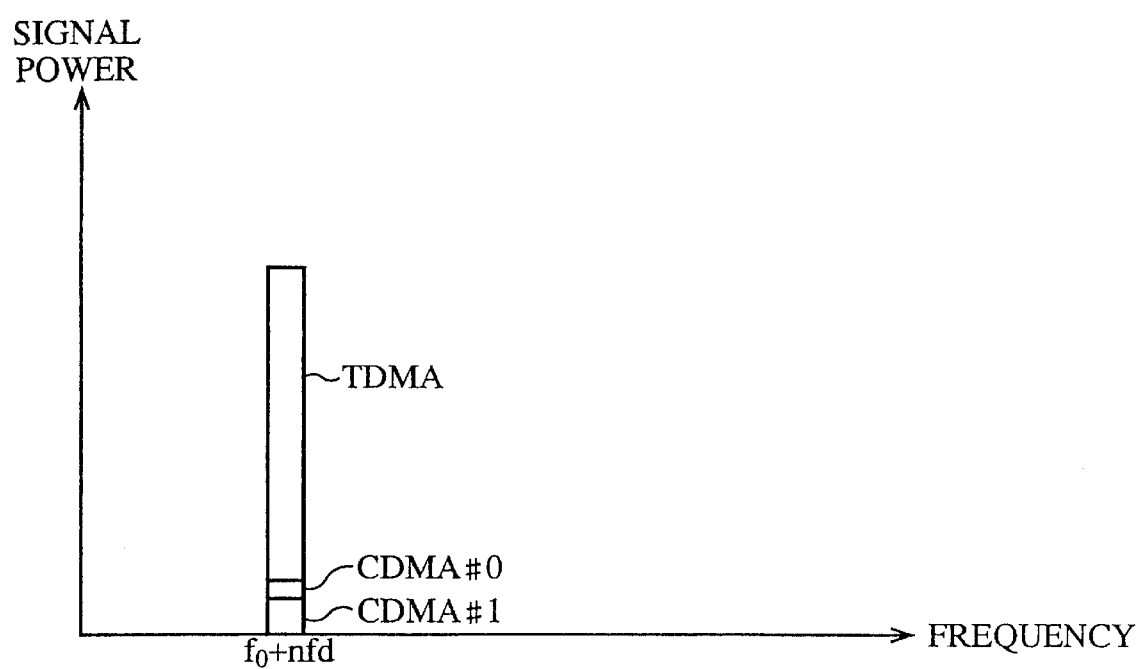
FIG. 30 is an explanatory view showing a frequency spectrum at output of an amplifier 71.

That is, since the amplifier 71 amplifies only the signal component at the frequency of $f_0+nfd$, the TDMA contained in the intermediate frequency signal can be extracted as the desired wave signal (see FIG. 30).

Embodiment 9

Though the TDMA is extracted as the desired wave signal in the embodiment 8, it must be noted that, for example, FDMA may be extracted as the desired wave signal, resulting in the same effect as that in the embodiment 8.

Figure 31:
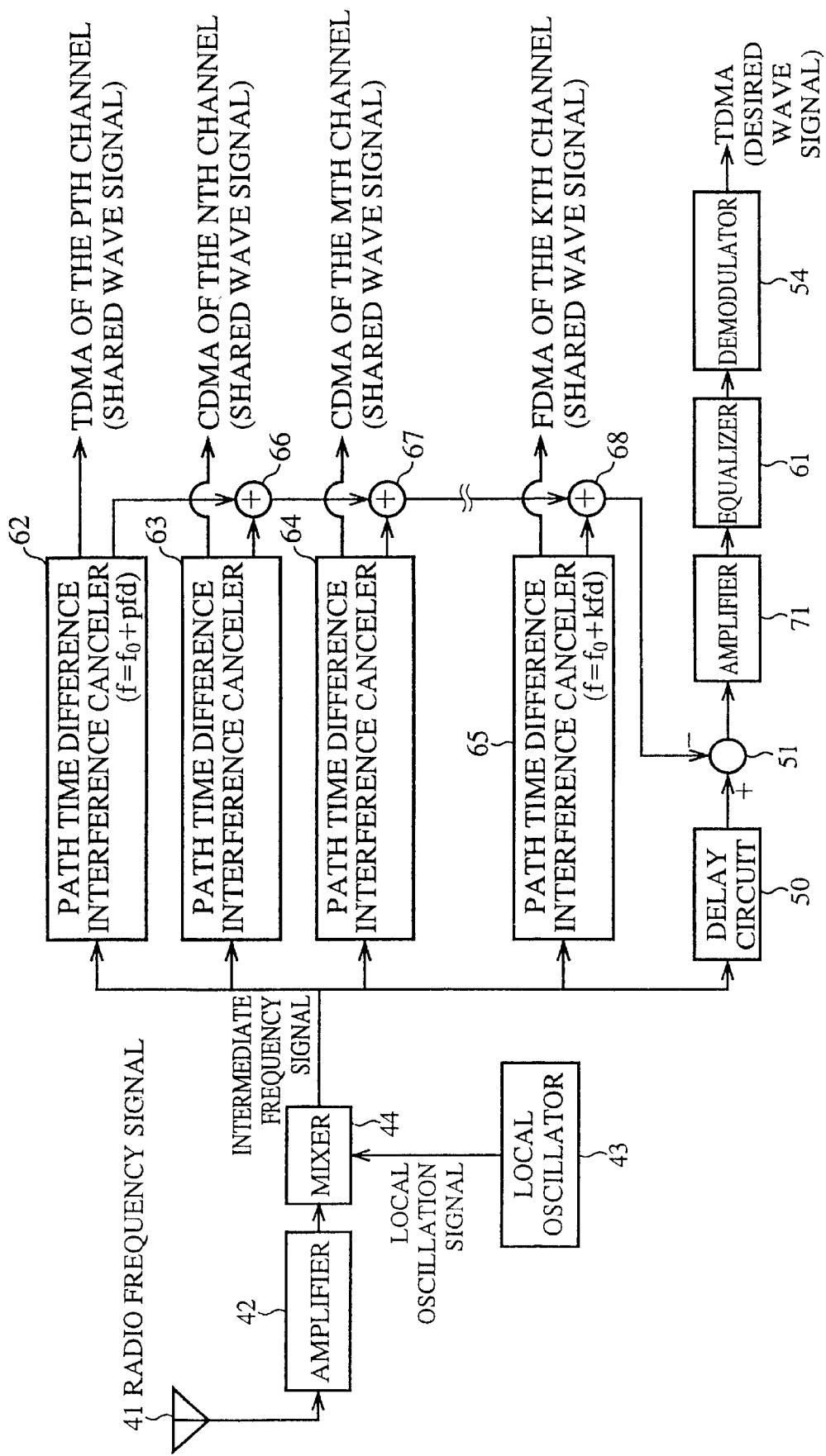
FIG. 31 is a block diagram showing a configuration of an apparatus for removing shared waves according to the embodiment 9 of the present invention.

Further, as in the embodiment 6, a structure as shown in FIG. 31 may be provided when an intermediate frequency signal contains many shared wave signals having high signal power.

INDUSTRIAL APPLICABILITY

As set forth above, when the radio frequency signal is received by a mobile station 21, a radio base station 22, a base station 33, and so forth, the apparatus for removing shared waves according to the present invention is suitable to remove a shared wave signal from a radio frequency signal, and extract a desired wave signal.

What is claimed is:

1. An apparatus for removing shared waves, comprising:
   intermediate frequency extracting means for extracting an intermediate frequency signal from a received radio frequency signal;
   shared wave reproducing means for reproducing a shared wave signal by amplifying a predetermined frequency component of the intermediate frequency signal extracted by the intermediate frequency extracting means, and demodulating and modulating the amplified predetermined frequency component to provide a reproduced shared wave signal;
   shared wave removing means for subtracting the reproduced shared wave signal from the intermediate frequency signal extracted by the intermediate frequency extracting means; and desired wave extracting means for extracting a desired wave signal through code correlation of the intermediate frequency signal resulting from subtraction of the shared wave signal by the shared wave removing means.

2. An apparatus for removing shared waves according to claim 1, wherein the shared wave reproducing means compensates for transmission path distortion of the predetermined frequency component, and provides the transmission path distortion for the reproduced shared wave signal.

3. An apparatus for removing shared waves according to claim 1, wherein the shared wave reproducing means detects a signal level of a shared wave signal contained in the intermediate frequency signal extracted by the intermediate frequency extracting means, and controls a signal level of the reproduced shared wave signal depending upon the result of detection.

4. An apparatus for removing shared waves according to claim 1, wherein phase difference detecting means is mounted for detecting a phase difference between the intermediate frequency signal extracted by the intermediate frequency extracting means and the shared wave signal reproduced by the shared wave reproducing means, and the shared wave reproducing means controlling a phase of the reproduced shared wave signal depending upon the result of detection of the phase difference detecting means.

5. An apparatus for removing shared waves according to claim 1, wherein the desired wave extracting means compensates for the transmission path distortion of the desired wave signal.

6. An apparatus for removing shared waves according to claim 1, wherein a plurality of shared wave reproducing means are mounted for reproducing different shared wave signals, and the shared wave removing means respectively subtracting the shared wave signals reproduced by the plurality of shared wave reproducing means from the intermediate frequency signal extracted by the intermediate frequency extracting means.

7. An apparatus for removing shared waves, comprising:

intermediate frequency extracting means for extracting an intermediate frequency signal from a received radio frequency signal;

shared wave reproducing means for reproducing a shared wave signal through code correlation of the intermediate frequency signal extracted by the intermediate frequency extracting means, compensating for transmission path distortion of the shared wave signal, demodulating and modulating the shared wave signal compensated for the transmission path distortion, and providing the transmission path distortion for the demodulated and modulated shared wave signal;

shared wave removing means for subtracting the shared wave signal for which the transmission path distortion is provided by the shared wave reproducing means from the intermediate frequency signal extracted by the intermediate frequency extracting means; and desired wave extracting means for extracting a desired wave signal through code correlation of the intermediate frequency signal resulting from subtraction of the shared wave signal by the shared wave removing means.

8. An apparatus for removing shared waves according to claim 7, wherein the shared wave reproducing means detects a signal level of a shared wave signal contained in the intermediate frequency signal extracted by the intermediate frequency extracting means, and controls a signal level of the reproduced shared wave signal depending upon the result of detection.

9. An apparatus for removing shared waves according to claim 7, wherein phase difference detecting means is mounted for detecting a phase difference between the intermediate frequency signal extracted by the intermediate frequency extracting means and the shared wave signal reproduced by the shared wave reproducing means, and the shared wave reproducing means controlling a phase of the reproduced shared wave signal depending upon the result of detection of the phase difference detecting means.

10. An apparatus for removing shared waves according to claim 7, wherein the desired wave extracting means compensates for the transmission path distortion of the desired wave signal.

11. An apparatus for removing shared waves according to claim 7, wherein a plurality of shared wave reproducing means are mounted for reproducing different shared wave signals, and the shared wave removing means respectively subtracting the shared wave signals reproduced by the plurality of shared wave reproducing means from the intermediate frequency signal extracted by the intermediate frequency extracting means.

12. An apparatus for removing shared waves, comprising:

intermediate frequency extracting means for extracting an intermediate frequency signal from a received radio frequency signal;

shared wave reproducing means for reproducing a shared wave signal through code correlation of the intermediate frequency signal extracted by the intermediate frequency extracting means, compensating for transmission path distortion of the shared wave signal, demodulating and modulating the shared wave signal compensated for the transmission path distortion, and providing the transmission path distortion for the demodulated and modulated shared wave signal to provide a reproduced shared wave signal;

shared wave removing means for subtracting the reproduced shared wave signal from the intermediate frequency signal extracted by the intermediate frequency extracting means; and desired wave extracting means for extracting a desired wave signal by amplifying a predetermined frequency component of the intermediate frequency signal resulting from subtraction of the shared wave signal by the shared wave removing means.

13. An apparatus for removing shared waves according to claim 12, wherein the shared wave reproducing means detects a signal level of a shared wave signal contained in the intermediate frequency signal extracted by the intermediate frequency extracting means, and controls a signal level of the reproduced shared wave signal depending upon the result of detection.

14. An apparatus for removing shared waves according to claim 12, wherein phase difference detecting means is mounted for detecting a phase difference between the intermediate frequency signal extracted by the intermediate frequency extracting means and the shared wave signal reproduced by the shared wave reproducing means, and the shared wave reproducing means controlling a phase of the reproduced shared wave signal depending upon the result of detection of the phase difference detecting means.

15. An apparatus for removing shared waves according to claim 12, wherein the desired wave extracting means compensates for the transmission path distortion of the desired wave signal.

16. An apparatus for removing shared waves according to claim 12, wherein a plurality of shared wave reproducing means are mounted for reproducing different shared wave signals, and the shared wave removing means respectively subtracting the shared wave signals reproduced by the plurality of shared wave reproducing means from the intermediate frequency signal extracted by the intermediate frequency extracting means.

* * * * *

UNITED STATES PATENT AND TRADEMARK OFFICE
CERTIFICATE OF CORRECTION

PATENT NO. : 6,249,541 B1
DATED : June 19, 2001
INVENTOR(S) : Yoshinori Uchida et al.

It is certified that error appears in the above-identified patent and that said Letters Patent is hereby corrected as shown below:

<u>Column 5,</u>
Line 29, delete "eight" and insert therefor -- eighth --.

Signed and Sealed this

Eighteenth Day of February, 2003

JAMES E. ROGAN
*Director of the United States Patent and Trademark Office*